US009667142B2

(12) United States Patent
Kuroiwa et al.

(10) Patent No.: US 9,667,142 B2
(45) Date of Patent: May 30, 2017

(54) POWER SUPPLY DEVICE WITH SHARED INDUCTIVE ELEMENTS UNDER SWITCH CONTROL

(71) Applicant: Renesas Electronics Corporation, Kawasaki-shi, Kanagawa (JP)

(72) Inventors: Hiroshi Kuroiwa, Kanagawa (JP);
Osamu Yamashita, Kanagawa (JP);
Masahiro Ishihara, Kanagawa (JP);
Minoru Kurosawa, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 328 days.

(21) Appl. No.: 14/030,055

(22) Filed: Sep. 18, 2013

(65) Prior Publication Data

US 2014/0084889 A1    Mar. 27, 2014

(30) Foreign Application Priority Data

Sep. 24, 2012   (JP) .................................. 2012-209531

(51) Int. Cl.
*G05F 1/00*      (2006.01)
*H02M 3/157*     (2006.01)
(Continued)

(52) U.S. Cl.
CPC ........... *H02M 3/157* (2013.01); *H02M 3/158* (2013.01); *H02M 2001/009* (2013.01)

(58) Field of Classification Search
CPC ...... H02M 3/155; H02M 3/156; H02M 3/157; H02M 3/1563; H02M 3/1566;
(Continued)

(56) References Cited

U.S. PATENT DOCUMENTS 7,342,436 B2    3/2008   Tsuchiya et al.
7,372,239 B2    5/2008   Kumagai et al.
(Continued)

OTHER PUBLICATIONS

Official Action dated Jan. 5, 2016, issued in Japanese Counterpart Application No. 2012-209531, *with English translation*.

*Primary Examiner* — Timothy J Dole
*Assistant Examiner* — Carlos Rivera-Perez
(74) *Attorney, Agent, or Firm* — Womble Carlyle

(57) ABSTRACT

A power supply device is responsive to load changes. The power supply device includes a switch control circuit, a charge control circuit, and a discharge control circuit. The switch control circuit controls switches so that electrical power is charged into an inductor, discharged from the inductor, and distributed to first and second capacitors in a time-division manner based on a switching cycle. The charge control circuit controls the amount of electrical power to be charged into the inductor based on a first amount of error between a first output power supply voltage and its target value and a second amount of error between a second output power supply voltage and its target value. The discharge control circuit controls a distribution ratio at which the electrical power discharged from the inductor is distributed to the first and second capacitors based on the ratio between the first and second amounts of error.

5 Claims, 13 Drawing Sheets

(51) Int. Cl.
*H02M 3/158* (2006.01)
*H02M 1/00* (2006.01)

(58) Field of Classification Search
CPC ............... H02M 3/158; H02M 3/1582; H02M 3/33561; H02M 2001/009; H02M 2001/008; H02M 2001/0009; H02M 2001/0083; H02M 3/00; H02M 3/02; H02M 3/145; H02M 3/1584; H02M 3/1588; H02M 2001/0025; H02M 2001/0067; H02M 2001/007; H02M 2001/0074; H02M 2001/0077
USPC ........ 323/205–211, 222–226, 259, 267–275, 323/282–288, 290, 351; 363/63, 363/123–127, 129, 130, 65–70; 327/535–538, 530; 307/11, 36–42, 80, 307/81; 315/160–176
See application file for complete search history.

(56) References Cited

U.S. PATENT DOCUMENTS

| | | |
|---|---|---|
| 7,852,056 B2 | 12/2010 | Nishida |
| 2011/0018518 A1* | 1/2011 | Peron ........................... 323/299 |
| 2011/0169468 A1* | 7/2011 | Wu ....................... H02M 3/157 |
| | | 323/282 |
| 2012/0187932 A1* | 7/2012 | Singnurkar .................. 323/282 |

* cited by examiner

POWER SUPPLY DEVICE WITH SHARED INDUCTIVE ELEMENTS UNDER SWITCH CONTROL

CROSS-REFERENCE TO RELATED APPLICATIONS

The disclosure of Japanese Patent Application No. 2012-209531 filed on Sep. 24, 2012 including the specification, drawings, and abstract is incorporated herein by reference in its entirety.

BACKGROUND

Field of the Invention

The present invention relates to a power supply device, and more particularly, to a switching power supply device that generates a plurality of output power supply voltages while retaining a small footprint.

Description of the Related Art

A positive/negative power supply generation device for generating a positive power supply and a negative power supply from a single power supply is described, for instance, in Japanese Unexamined Patent Publication No. 2003-186552. During a first time period, the positive/negative power supply generation device charges electrical power into an inductor and then discharges the charged electrical power to a positive power supply capacitor through a first diode. During a subsequent time period, the positive/negative power supply generation device charges electrical power again into the inductor and then discharges the charged electrical power to a negative power supply capacitor through a second diode.

A switching regulator capable of outputting both an arbitrary positive voltage and an arbitrary negative voltage without regard to an input voltage is described in Japanese Unexamined Patent Publication No. 2009-5442. The switching regulator charges electrical power into an inductor, and then discharges the charged electrical power to a negative voltage capacitor through a third switch and at the same time discharges the charged electrical power to a positive voltage capacitor through a fourth switch. During this discharge period, one end of the inductor is coupled to the negative voltage capacitor through the third switch in the ON state and the other end of the inductor is coupled to the negative voltage capacitor through the fourth switch in the ON state.

SUMMARY

In recent years, power supplies having a plurality of channels are increasingly incorporated in various electronic devices. However, an increase in the footprint and an increase in the cost of parts, which are required for implementing such a multi-channel power supply, have now become problems. In general, a switching power supply device generates a single output power supply voltage by using one inductor. In such an instance, a plurality of inductors are required for implementing a multi-channel power supply (generating a plurality of output power supply voltages). However, the inductors have a relatively large footprint compared to the other parts of the switching power supply device and entail a high cost. Under such circumstances, methods of generating a plurality of output power supply voltages by using one inductor are described, for instance, in Japanese Unexamined Patent Publications No. 2003-186552 and No. 2009-5442.

However, the method described in Japanese Unexamined Patent Publication No. 2003-186552 covers a limited range of applications because it does not adequately respond, for instance, to load changes. The configuration described in Japanese Unexamined Patent Publication No. 2009-5442 also covers a limited range of applications because, for example, the employed circuit configuration and control method become complicated and the generation of a booster power supply become difficult due to the described circuit coupling scheme. The disclosed embodiments of the present invention overcome the described drawbacks, while other novel features will become apparent from the following description and from the accompanying drawings.

According to an aspect of the present invention, a power supply device includes a plurality of switches, an inductor, a first capacitor, a second capacitor, a switch control circuit, a first control circuit, and a second control circuit. The switch control circuit controls the switches so that electrical power is charged into the inductor, then discharged from the inductor, and distributed to the first and second capacitors in a time-division manner within a switching cycle. The electrical power discharged from the inductor generates a first output power supply voltage at one end of the first capacitor, and generates a second output power supply voltage at one end of the second capacitor. The first control circuit controls the amount of electrical power to be charged into the inductor in accordance with the result of adding the amount of error of the first output power supply voltage from its target value to the amount of error of the second output power supply voltage from its target value. The second control circuit controls a distribution ratio, at which the electrical power discharged from the inductor is distributed to the first and second capacitors in a time-division manner, in accordance with the ratio between the amount of error of the first output power supply voltage from its target value and the amount of error of the second output power supply voltage from its target value.

The above-described aspect of the present invention makes it possible to improve responsiveness to load changes.

BRIEF DESCRIPTION OF THE DRAWINGS

Embodiments of the present invention will be described in detail based on the following figures, in which.

DETAILED DESCRIPTION

Figure 1:
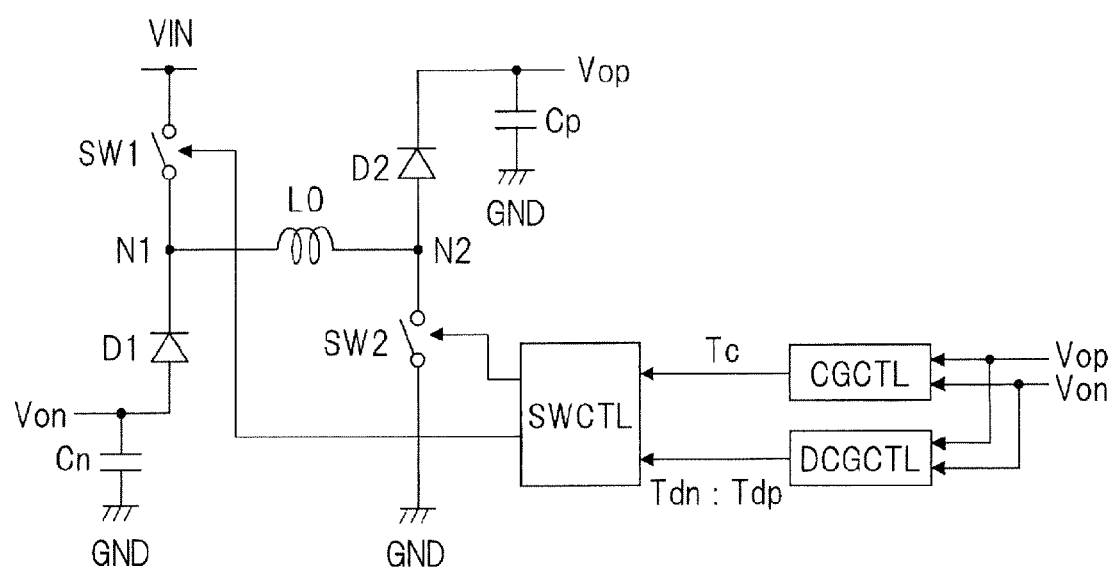
FIG. 1 is a schematic diagram illustrating an exemplary configuration of a power supply device according to a first embodiment of the present invention.

In the following description of the embodiments, if necessary for convenience sake, a description of the present invention will be divided into plural sections or embodiments, but unless specifically stated, they are not unrelated to each other, but are in such a relation that one is a modification, a detailed explanation, a supplementary explanation, or the like of a part or the whole of the other. Also, in the embodiments described below, when referring to the number of elements (including the number of pieces, numerical values, amounts, ranges, and the like), the number of elements is not limited to a specific number unless specifically stated or except the case where the number is apparently limited to a specific number in principle. The number larger or smaller than the specified number is also applicable.

Further, in the embodiments described below, their components (including operating steps and the like) are not always indispensable unless specifically stated or except the case where the components are apparently indispensable in principle. Similarly, in the embodiments described below, when the shape of the components, the positional relationship therebetween, and the like are mentioned, the substantially approximate and similar shapes and the like are included therein unless specifically stated or except the case where it is conceivable that they are apparently excluded in principle. The same goes for the aforementioned numerical values and ranges.

Moreover, circuit elements included in each functional block of the embodiments are not limited in particular, but are formed over a semiconductor substrate of single crystal silicon or the like by using a known integrated circuit technology for a CMOS transistor (complementary MOS transistor) or the like. Although a MOSFET (Metal Oxide Semiconductor Field Effect Transistor) (abbreviated as a MOS transistor) is used in the embodiments as an example of a MISFET (Metal Insulator Semiconductor Field Effect Transistor), a non-oxide film is not excluded as a gate insulating film.

Embodiments of the present invention will now be described in detail with reference to the accompanying drawings. In the drawings depicting the embodiments, like elements are generally designated by like reference numerals. Such like elements will not be redundantly described.

First Embodiment

FIG. 1 is a schematic diagram illustrating an exemplary configuration of a power supply device according to a first embodiment of the present invention. The power supply device shown in FIG. 1 includes a plurality of switches SW1, SW2, an inductor L0, diodes D1, D2, capacitors Cp, Cn, a switch control circuit SWCTL, a charge control circuit (first control circuit) CGCTL, and a discharge control circuit (second control circuit) DCGCTL. The inductor L0 is coupled between a first node N1 and a second node N2. The switch SW1 (first switch) is coupled between a power supply voltage VIN and the node N1. The switch SW2 (second switch) is coupled between a ground power supply voltage GND and the node N2. The cathode of the diode D1 (first diode) is coupled to the node N1. The anode of the diode D2 (second diode) is coupled to the node N2. The capacitor Cn (first capacitor) is coupled at one end to the ground power supply voltage GND and at the other end to the anode of the diode D1. An output power supply voltage Von is generated at the capacitor Cn. The capacitor Cp (second capacitor) is coupled at one end to the ground power supply voltage GND and at the other end to the cathode of the diode D2. An output power supply voltage Vop is generated at the capacitor Cp.

Figure 2A:
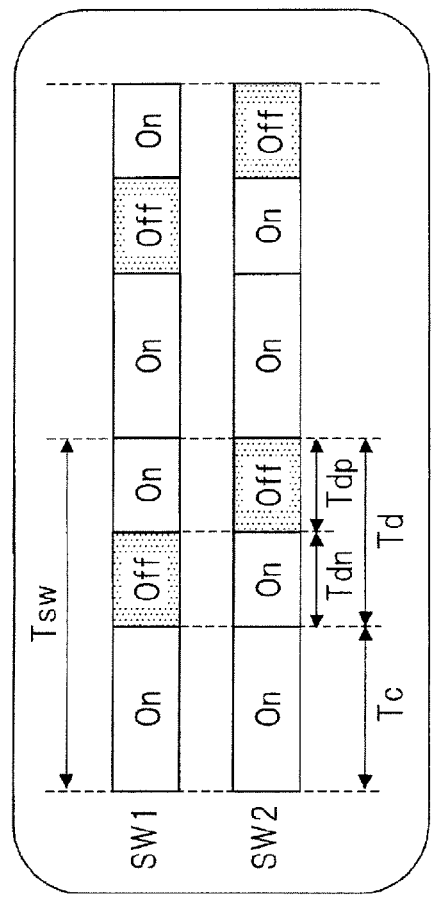
FIG. 2A is a schematic diagram illustrating an exemplary operation of the power supply device shown in FIG. 1.
Figure 2D:
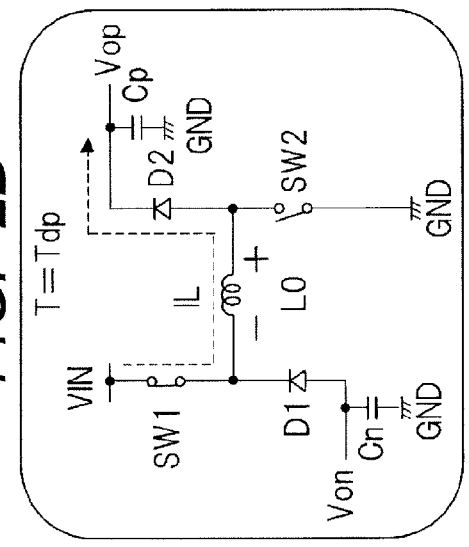
FIGS. 2B, 2C, and 2D are supplementary diagrams illustrating an example of a circuit's internal state prevailing during a specific operating period shown in FIG. 2A.
Figure 2C:
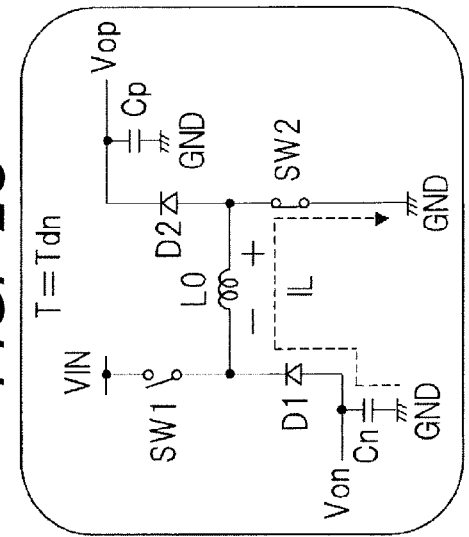
Figure 2B:
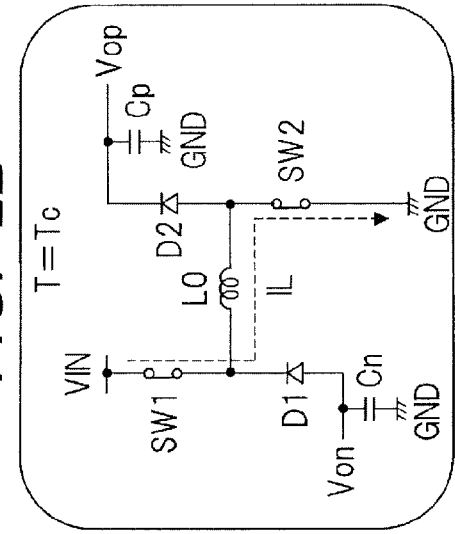

FIG. 2A is a schematic diagram illustrating an exemplary operation of the power supply device shown in FIG. 1. FIGS. 2B, 2C, and 2D are supplementary diagrams illustrating an example of a circuit's internal state prevailing during a specific operating period or mode of operation shown in FIG. 2A. For example, FIG. 2B illustrates a first mode of operation, FIG. 2C illustrates a second mode of operation, and FIG. 2D illustrates a third mode of operation. As shown in FIG. 2A, a switching cycle Tsw includes a charge period (first period) Tc and a subsequent discharge period Td. The discharge period Td includes a negative voltage side discharge period (second period) Tdn and a subsequent positive voltage side discharge period (third period) Tdp. During the charge period Tc, the switch control circuit SWCTL shown in FIG. 1 exercises control so that the switches SW1, SW2 are on. Then, as shown in FIG. 2B, an inductor current IL flows from the power supply voltage VIN through the inductor L0 to the ground power supply voltage GND so as to charge electrical power into the inductor L0.

During the negative voltage side discharge period Tdn, the switch control circuit SWCTL exercises control so as to keep the switch SW1 off and keep the switch SW2 on. Then, as shown in FIG. 2C, the inductor current IL flows from the ground power supply voltage GND through the capacitor Cn, the diode D1, the inductor L0 to the switch SW2 so that part of the electrical power discharged from the inductor L0 is supplied to the capacitor Cn. During the positive voltage side discharge period Tdp, the switch control circuit SWCTL exercises control so as to keep the switch SW1 on and keep the switch SW2 off. As shown in FIG. 2D, the inductor current IL flows from the power supply voltage VIN through the switch SW1, the inductor L0, the diode D2, to the capacitor Cp so that the remaining portion of the electrical power discharged from the inductor L0 is supplied to the capacitor Cp.

As described above, the switch control circuit SWCTL controls the switches SW1, SW2 so that electrical power is charged into the inductor L0, then discharged from the inductor L0, and distributed to the capacitors Cn, Cp in a time-division manner. As a result, the output power supply voltage Vop, which is a positive voltage obtained by boosting the power supply voltage VIN, is generated in the capacitor Cp. The output power supply voltage Von, which is a negative voltage lower than the ground power supply voltage GND, is generated in the capacitor Cn. Here, it is assumed that the discharge period Td is sequentially formed by the negative voltage side discharge period Tdn and the positive voltage side discharge period Tdp. On the contrary, however, the discharge period Td may be sequentially formed by the positive voltage side discharge period Tdp and the negative voltage side discharge period Tdn.

Referring to FIG. 2A, the length of the charge period Tc is controlled by the charge control circuit CGCTL shown in FIG. 1. The charge control circuit CGCTL controls the length of the charge period Tc in accordance with the sum of the amount of error between the output power supply voltage (negative voltage) Von and its target value and the amount of error between the output power supply voltage (positive voltage) Vop and its target value for the purpose of controlling the amount of electrical power to be charged into the inductor L0. For example, let us assume that neither the output power supply voltage (negative voltage) Von nor the output power supply voltage (positive voltage) Vop has reached a target value (the output power supply voltage Von is higher than a target negative voltage and the output power supply voltage Vop is lower than a target positive voltage) with reference to a steady state (the output power supply voltages Von, Vop are both equal to their target values). In this case, the charge control circuit CGCTL increases the length of the charge period Tc in accordance with the sum of the shortfall in the output power supply voltage Von and the shortfall in the output power supply voltage Vop. As a different example, let us assume that the output power supply voltage Von and the output power supply voltage Vop both have exceeded their target values (the output power supply voltage Von is lower than the target negative voltage and the output power supply voltage Vop is higher than the target positive voltage) with reference to the steady state. In this case, the charge control circuit CGCTL decreases the length of the charge period Tc in accordance with the sum of the excess in the output power supply voltage Von and the excess in the output power supply voltage Vop. As yet another different example, let us assume that the output power supply voltage Von has not reached its target value and that the output power supply voltage Vop has exceeded its target value with reference to the steady state. In this case, the charge control circuit CGCTL increases the length of the charge period Tc in accordance with the difference between the shortfall and the excess if the shortfall is greater than the excess, and decreases the length of the charge period Tc in accordance with the difference between the shortfall and the excess if the excess is greater than the shortfall.

Referring to FIG. 2A, the length of the negative voltage side discharge period Tdn and the length of the positive voltage side discharge period Tdp are controlled by the discharge control circuit DCGCTL shown in FIG. 1. The discharge control circuit DCGCTL controls the length ratio between the negative voltage side discharge period Tdn and the positive voltage side discharge period Tdp in accordance with the ratio between the amount of error of the output power supply voltage Von from its target value and the amount of error of the output power supply voltage Vop from its target value for the purpose of controlling the distribution ratio at which the electrical power discharged from the inductor L0 is distributed to the capacitors Cn, Cp in a time-division manner. The discharge period Td is equal to "Tdn plus Tdp" and "switching cycle Tsw minus charge period Tc". Therefore, as the length ratio between Tdn and Tdp is controlled, the length of Tdn and the length of Tdp are also controlled.

Let us assume, for example, that the output power supply voltage Von has not reached its target value with reference to the steady state or that the output power supply voltage Vop has exceeded its target value with reference to the steady state. In this case, the discharge control circuit DCGCTL controls the length ratio between the negative voltage side discharge period Tdn and the positive voltage side discharge period Tdp in such a manner as to increase the distribution ratio for the output power supply voltage Von by the amount of shortfall or excess. In other words, the ratio of the negative voltage side discharge period Tdn to the discharge period Td is increased and the ratio of the positive voltage side discharge period Tdp is decreased. As a different example, let us assume that the output power supply voltage Von has exceeded its target value with reference to the steady state or that the output power supply voltage Vop has not reached its target value with reference to the steady state. In this case, the discharge control circuit DCGCTL controls the length ratio between the negative voltage side discharge period Tdn and the positive voltage side discharge period Tdp in such a manner as to decrease the distribution ratio for the output power supply voltage Von by the amount of shortfall or excess. In other words, the ratio of the negative voltage side discharge period Tdn to the discharge period Td is decreased and the ratio of the positive voltage side discharge period Tdp to the discharge period Td is increased.

Figure 3A:
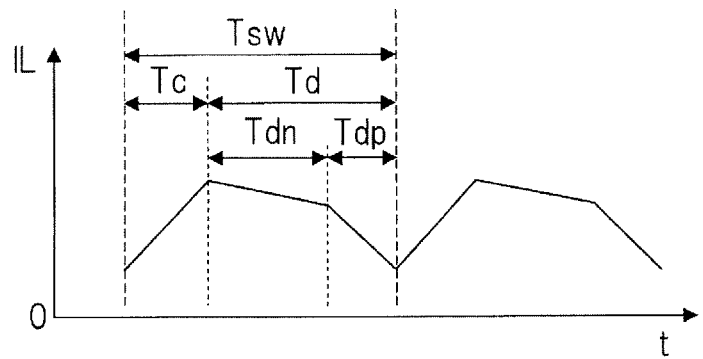
FIGS. 3A, 3B, and 3C are supplementary diagrams illustrating exemplary characteristics of the power supply device shown in FIG. 1.
Figure 3B:
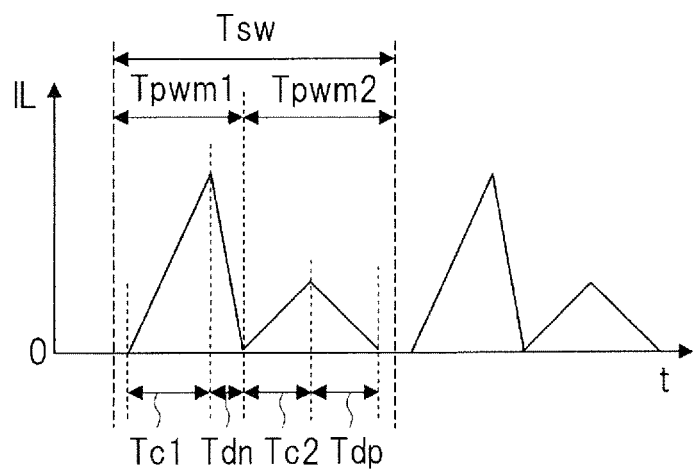
Figure 3C:
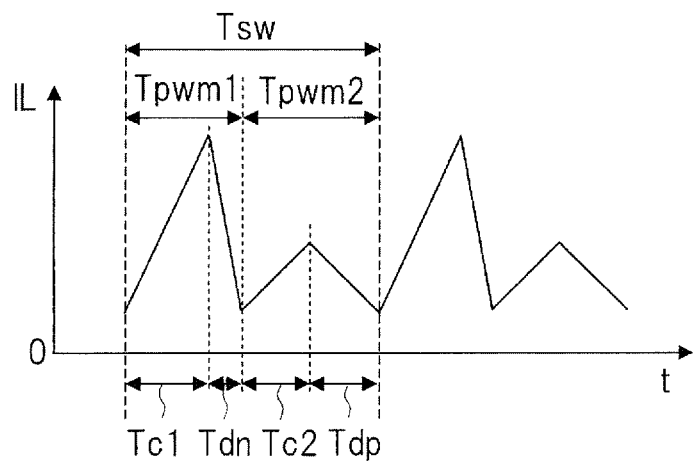

The first embodiment, which has been described above, produces effects and benefits described, for example, under sections (1) to (4), presented below. FIGS. 3A, 3B, and 3C are supplementary diagrams illustrating exemplary characteristics of the power supply device shown in FIG. 1 as compared to a different power supply. FIG. 3A shows exemplary changes in the inductor current IL in the power supply device shown in FIG. 1, and depicts an operation performed in a so-called continuous current mode (CCM). FIG. 3B shows exemplary changes in the inductor current IL in a different power supply device that has been studied as an example for comparison with the present embodiment, and depicts an operation performed in a so-called discontinuous current mode (DCM). FIG. 3C shows exemplary changes in the inductor current IL in another power supply device that has been studied as an example for comparison with the present embodiment, and depicts an operation that is performed when the CCM is applied to the power supply device associated with FIG. 3B.

(1) Responsiveness to load changes (current changes in a load to which the output power supply voltages Von, Vop are supplied) can be improved. As shown in FIGS. 2A and 3A, a method provided by the first embodiment is configured so that the switching cycle Tsw includes one PWM cycle, which includes the charge period Tc and the discharge period Td. Meanwhile, a method described, for instance, in Japanese Unexamined Patent Publication No. 2003-186552 (hereinafter referred to as the dual-partitioning method) is configured so that the switching cycle Tsw includes a PWM cycle Tpwm1, which has a charge period Tc1 and a discharge period Tdn, and a PWM cycle Tpwm2, which has a charge period Tc2 and a discharge period Tdp, as shown in FIG. 3B. Therefore, when the method provided by the first embodiment is used, the switching cycle can be made shorter (by raising a switching frequency) than when the dual-partitioning method is used. As a result, the responsiveness to load changes improves. Raising the switching frequency makes it possible, for example, to downsize the inductor L0 and capacitors Cp, Cn. Such downsizing will also be beneficial from the viewpoint of cost and footprint.

(2) A current supply capacity can be increased. When the dual-partitioning method is employed, it is necessary to use the discontinuous current mode (DCM), which zeros the inductor current IL (its offset amount) at the boundary between the PWM cycles Tpwm1, Tpwm2, as shown in FIG. 3B, in order to provide cross regulation characteristics. To increase the current supply capacity in this instance, it is necessary to increase the peak value of the inductor current IL. However, this peak value is limited by the inductor's magnetic saturation characteristics. In addition, increasing the peak value results in an increased ripple, thereby causing other problems, including restricting the current supply capacity.

When, on the other hand, the method provided by the present embodiment is employed, the continuous current mode (CCM) can be used while adequate cross regulation characteristics are provided. This makes it possible to increase the current supply capacity. In other words, when the CCM is used, because of an offset amount provided by the inductor current IL, the peak value of the inductor current IL can be decreased when the current to be supplied has the same current value as the current supplied in the discontinuous current mode (DCM). Thus, the current supply capacity can be increased by an amount equivalent to such a decrease in the peak value. Further, the use of the CCM results in a smaller amount of ripple than the use of the DCM. This also increases the current supply capacity.

The term "cross regulation" refers to the influence of a load current change in one load upon the output power supply voltage of another load. The smaller the magnitude of the influence, the better the cross regulation characteristics. Let us assume, for example, that the load current of one load is changed from a steady state as shown in FIG. 3C when the continuous current mode (CCM) is applied to the dual-partitioning method. In this case, the offset amount of the inductor current IL changes during power supply control of the one load (e.g., Tpwm1), and when power supply control is subsequently provided over the other load (Tpwm2), electrical power is charged into the inductor with the inductor current IL having the changed offset amount regarded as a starting point. Accordingly, when power supply control is provided over the other load (Tpwm2), the amount of electrical power discharged from the inductor may change to influence the output power supply voltage. Consequently, the discontinuous current mode (DCM) indicated, for instance, in FIG. 3B is applied.

Meanwhile, referring to FIG. 3A, when the load current of one load is changed from a steady state, the method provided by the present embodiment allows the amount of electrical power charged into the inductor L0 (charge period Tc) to change accordingly, but exercises control so that the change in the amount of electrical power discharged from the inductor L0 is mostly distributed to the one load. When, for instance, the load current of the load on the side toward the output power supply voltage Vop is increased, the charge period Tc lengthens and the peak value of the inductor current IL increases. However, the ratio of the negative voltage side discharge period Tdn decreases to increase the ratio of the positive voltage side discharge period Tdp. As a result, the amount of electrical power discharged during the positive voltage side discharge period Tdp increases without causing a significant change in the amount of electrical power discharged during the negative voltage side discharge period Tdn. Hence, the influence on the output power supply voltage Von decreases to obtain adequate cross regulation characteristics. Further, even if the output power supply voltage is influenced, this influence is lessened by a faster response than that is obtained during the use of the dual-partitioning method as described under section (1) above. Therefore, in this respect, too, improved cross regulation characteristics can be obtained.

(3) Switching loss can be reduced. When the dual-partitioning method is used, a total of four switching operations are required because two electrical power charge operations (Tc1, Tc2) and two electrical power discharge operations (Tdn, Tdp) are performed within the switching cycle Tsw as shown in FIG. 3B. On the other hand, the present embodiment performs one electrical power charge operation (Tc) and two electrical power discharge operations (Tdn, Tdp) within the switching cycle Tsw. Therefore, a total of three switching operations will suffice when the present embodiment is used. Hence, the present embodiment can reduce the switching loss.

(4) Power supply control can be exercised by using a simple circuit configuration and a simple control method. The method described, for instance, in Japanese Unexamined Patent Publication No. 2009-5442 simultaneously supplies electrical power to both capacitors unlike the method employed by the present embodiment, which supplies electrical power to capacitors in a time-division manner. Hence, it is difficult for the method described in Japanese Unexamined Patent Publication No. 2009-5442 to control the distribution ratio of the discharge amount of electrical power unlike the method employed by the present embodiment. Therefore, when any excess is detected while electrical power is simultaneously supplied to both capacitors, the configuration described in Japanese Unexamined Patent Publication No. 2009-5442 shuts off the supply of electrical power by turning off a switch related to the detected excess. It should be noted, however, that the configuration described in Japanese Unexamined Patent Publication No. 2009-5442 opens one end of the inductor when the related switch is turned off. Thus, the configuration described in Japanese Unexamined Patent Publication No. 2009-5442 includes another switch for inhibiting one end of the inductor from opening. Consequently, the configuration described in Japanese Unexamined Patent Publication No. 2009-5442 necessitates a complicated circuit and a complicated control scheme due to the number of switches and their associated control. On the other hand, the method employed by the present embodiment can simplify the circuit configuration and control scheme because it only needs to control two switches (SW1, SW2) as indicated in FIG. 1.

Second Embodiment

The first embodiment has been described with reference to a case where one inductor is used to generate a positive voltage (boosted voltage) and a negative voltage as output power supply voltages. A second embodiment of the present invention will now be described with reference to a case where one inductor is used to generate two positive voltages as output power supply voltages and to a case where one inductor is used to generate two negative voltages as output power supply voltages.

Figure 4:
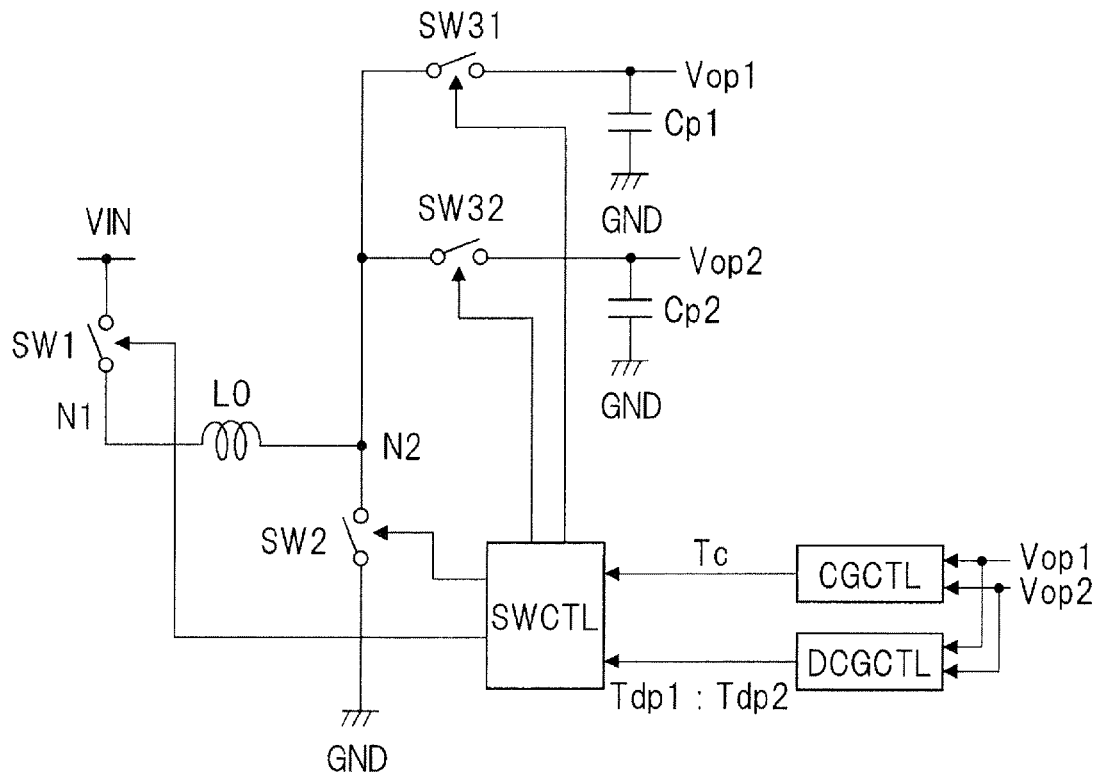
FIG. 4 is a schematic diagram illustrating an exemplary configuration of a power supply device according to a second embodiment of the present invention.

FIG. 4 is a schematic diagram illustrating an exemplary configuration of a power supply device according to the second embodiment of the present invention. The power supply device shown in FIG. 4 includes a plurality of switches SW1, SW2, SW31, SW32, an inductor L0, capacitors Cp1, Cp2, a switch control circuit SWCTL, a charge control circuit (first control circuit) CGCTL, and a discharge control circuit (second control circuit) DCGCTL. The switch SW1, the inductor L0, and the switch SW2 are coupled in the same manner as shown in FIG. 1. The switches SW31, SW32 are both coupled at one end to node N2 for access to power stored in the inductor L0. The capacitor Cp1 (first capacitor) is coupled at one end to a ground power supply voltage GND and at the other end to the switch SW31. An output power supply voltage Vop1 is generated at the capacitor Cp1. The capacitor Cp2 (second capacitor) is coupled at one end to the ground power supply voltage GND and at the other end to the switch SW32. An output power supply voltage Vop2 is generated at the capacitor Cp2.

Figure 5:
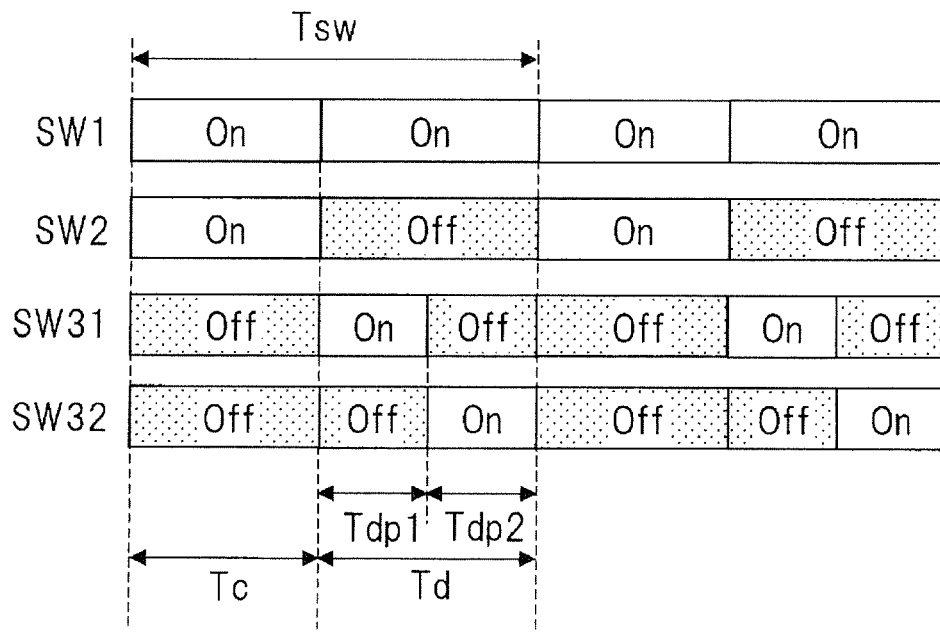
FIG. 5 is a schematic diagram illustrating an exemplary operation of the power supply device shown in FIG. 4.

FIG. 5 is a schematic diagram illustrating an exemplary operation of the power supply device shown in FIG. 4. As shown in FIG. 5, a switching cycle Tsw includes a charge period (first period) Tc and a subsequent discharge period Td. The discharge period Td includes a positive voltage side discharge period (second period) Tdp1 and a subsequent positive voltage side discharge period (third period) Tdp2. During the charge period Tc, the switch control circuit SWCTL shown in FIG. 4 exercises control so that the switches SW1, SW2 are on. Then, electrical power is charged into the inductor L0 in the same manner as indicated in FIG. 2B.

During the positive voltage side discharge period [1] Tdp1, the switch control circuit SWCTL exercises control so that the switch SW1 is on and that the switch SW2 is off, and also exercises control so as to keep the switch SW31 on and keep the switch SW32 off. A circuit state prevailing in this instance is such that the diode D2 shown in FIG. 2D is substituted by the switch S31 placed in the ON state. As a result, part of the electrical power discharged from the inductor L0 is supplied to the capacitor Cp1. During the positive voltage side discharge period [2] Tdp2, the switch control circuit SWCTL exercises control so that the switch SW1 is on and that the switch SW2 is off, and also exercises control so as to keep the switch SW31 off and keep the switch SW32 on. A circuit state prevailing in this instance is such that the diode D2 shown in FIG. 2D is substituted by the switch S32 placed in the ON state. As a result, the remaining portion of the electrical power discharged from the inductor L0 is supplied to the capacitor Cp2.

As described above, the switch control circuit SWCTL controls the switches SW1, SW2, SW31, SW32 so that electrical power is charged into the inductor L0, then discharged from the inductor L0, and distributed to the capacitors Cp1, Cp2 in a time-division manner, as is the case shown in FIG. 1. As a result, the output power supply voltage Vop1, which is a positive voltage obtained by boosting the power supply voltage VIN, is generated in the capacitor Cp1. The output power supply voltage Vop2, which is a positive voltage obtained by boosting the power supply voltage VIN, is generated in the capacitor Cp2. In this instance, the charge control circuit CGCTL controls the length of the charge period Tc in accordance with the sum of the amount of error between the output power supply voltage Vop1 and its target value and the amount of error between the output power supply voltage Vop2 and its target value for the purpose of controlling the amount of electrical power to be charged into the inductor L0, as is the case shown in FIG. 1. Further, the discharge control circuit DCGCTL controls the length ratio between the positive voltage side discharge period Tdp1 and the positive voltage side discharge period Tdp2 in accordance with the ratio between the amount of error of the output power supply voltage Vop1 from its target value and the amount of error of the output power supply voltage Vop2 from its target value, as is the case shown in FIG. 1, for the purpose of controlling the distribution ratio at which the electrical power discharged from the inductor L0 is distributed to the capacitors Cp1, Cp2 in a time-division manner.

Figure 6:
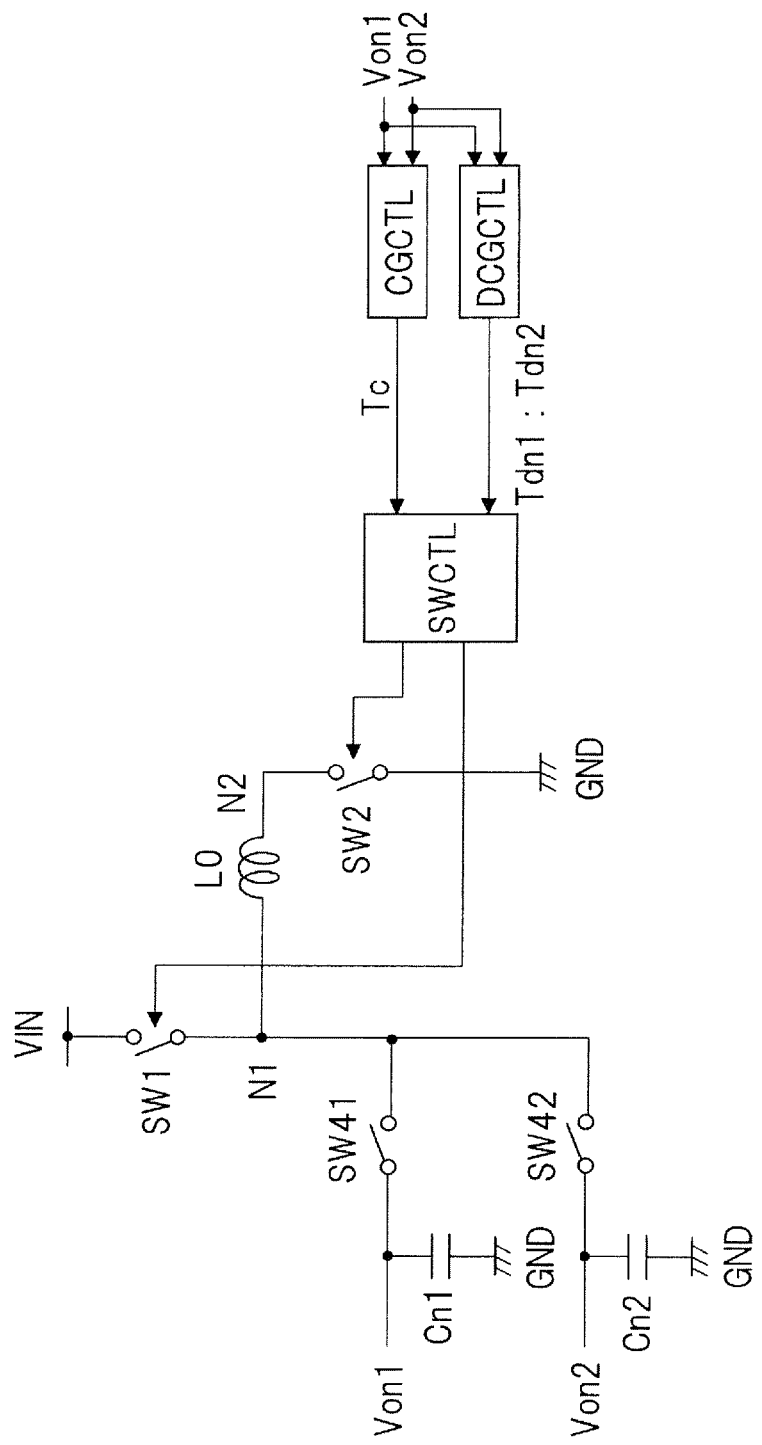
FIG. 6 is a schematic diagram illustrating another exemplary configuration of the power supply device according to the second embodiment of the present invention.

FIG. 6 is a schematic diagram illustrating another exemplary configuration of the power supply device according to the second embodiment of the present invention. The power supply device shown in FIG. 6 includes a plurality of switches SW1, SW2, SW41, SW42, an inductor L0, capacitors Cn1, Cn2, a switch control circuit SWCTL, a charge control circuit (first control circuit) CGCTL, and a discharge control circuit (second control circuit) DCGCTL. The switch SW1, the inductor L0, and the switch SW2 are coupled in the same manner as shown in FIG. 1. The switches SW41, SW42 are both coupled at one end to node N1 for access to power stored in the inductor L0. The capacitor Cn1 (first capacitor) is coupled at one end to a ground power supply voltage GND and at the other end to the switch SW41. An output power supply voltage Von1 is generated at the capacitor Cn1. The capacitor Cn2 (second capacitor) is coupled at one end to the ground power supply voltage GND and at the other end to the switch SW42. An output power supply voltage Von2 is generated at the capacitor Cn2.

The power supply device shown in FIG. 6 operates in such a manner that the switches SW31, SW32 shown in FIG. 5 are respectively changed to the switches SW41, SW42, and that the positive voltage side discharge period Tdp1 and the positive voltage side discharge period Tdp2 shown in FIG. 5 are respectively changed to a first negative voltage side discharge period and a second negative voltage side discharge period. During the first negative voltage side discharge period and the second negative voltage side discharge period, control is exercised in a manner different from that shown in FIG. 5 so as to keep the switch SW1 off and keep the switch SW2 on. The resulting circuit state is such that the diode D1 shown in FIG. 2C is substituted by the switch SW41 placed in the ON state or by the switch SW42 placed in the ON state. Further, the charge control circuit CGCTL and the discharge control circuit DCGCTL perform the same operation on the output power supply voltages Von1, Von2 as indicated in FIG. 5. As a result, the negative output power supply voltage Von1 is generated in the capacitor Cn1, and the negative output power supply voltage Von2 is generated in the capacitor Cn2.

As described above, the use of the power supply device according to the second embodiment makes it possible to not only produce the same effects as the power supply device according to the first embodiment, but also generate a combination of two positive output power supply voltages or two negative output power supply voltages. Although the second embodiment has been described on the assumption that the power supply device generates two output power supply voltages, the power supply device may be configured to generate three or more output power supply voltages as well. Further, the exemplary configuration of the second embodiment may be combined with the exemplary configuration shown in FIG. 1 to generate one negative voltage and two positive voltages. This combined configuration can be achieved, for instance, by replacing individual circuits positioned as shown in FIG. 1 between the node N2 and the diode D2 with the switches SW31, SW32 and capacitors Cp1, Cp2 shown in FIG. 4. Furthermore, although FIG. 4 shows an exemplary configuration of a booster circuit, the booster circuit may be changed to a voltage down converter. Such an altered configuration can be achieved, for instance, by disposing an additional switch between the node N1 shown in FIG. 4 and the ground power supply voltage GND and exercising control to keep the additional switch on, instead of keeping the switch SW1 on, during the discharge period Td shown in FIG. 5.

Third Embodiment

A third embodiment of the present invention will now be described by giving further details of the power supply device shown in FIG. 1, which has been described in conjunction with the first embodiment.

Figure 7:
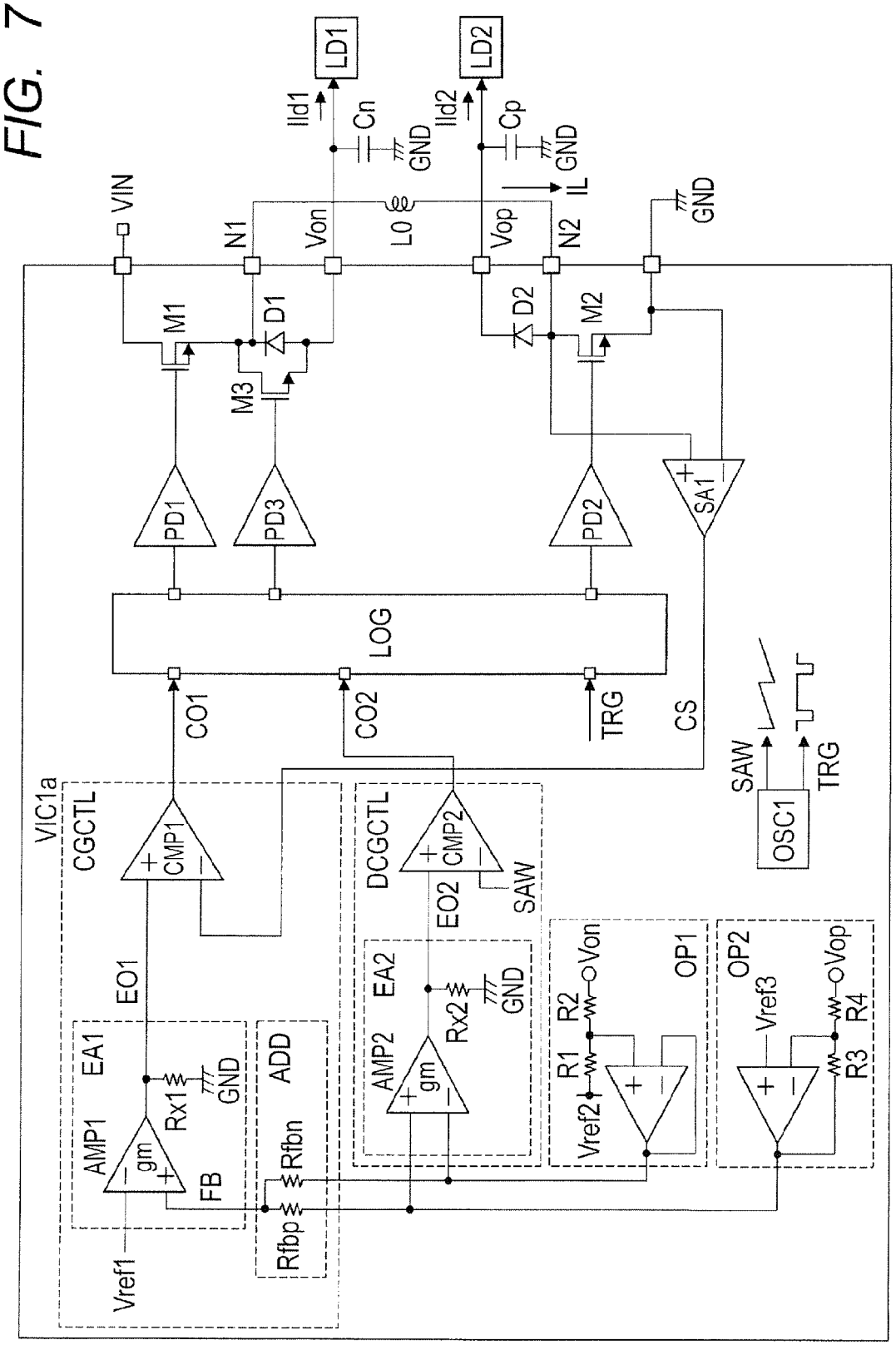
FIG. 7 is a circuit diagram illustrating an exemplary configuration of a power supply device according to a third embodiment of the present invention.

FIG. 7 is a schematic diagram illustrating an exemplary configuration of a power supply device according to the third embodiment of the present invention. The power supply device shown in FIG. 7 includes, for example, a power supply control device VIC1a, an inductor L0, and capacitors Cn, Cp. The power supply control device VIC1a is formed on a semiconductor chip. The inductor L0 and the capacitors Cn, Cp are the parts external to the power supply control device VIC1a. Output power supply voltages Von, Vop are respectively generated in the capacitors Cn, Cp, as is the case shown in FIG. 1. The output power supply voltage Von is supplied to an external load LD1, and the power supply voltage Vop is supplied to an external load LD2.

The power supply control device VIC1a includes a control logic circuit LOG, pre-driver circuits PD1-PD3, NMOS transistors M1-M3, diodes D1, D2, a current detection circuit SA1, a charge control circuit CGCTL, a discharge control circuit DCGCTL, operational amplifier circuits OP1, OP2, and an oscillator circuit OSC1. The NMOS transistors M1, M2 respectively correspond to the switches SW1, SW2 shown in FIG. 1. The diodes D1, D2 are coupled in the same manner as shown in FIG. 1. A power supply voltage VIN is supplied to the drain of the NMOS transistor M1 through an external terminal. The source of the NMOS transistor M1 is coupled to one end of the inductor L0 through an external terminal (node N1). A ground power supply voltage GND is supplied to the source of the NMOS transistor M2 through an external terminal. The drain of the NMOS transistor M2 is coupled to the other end of the inductor L0 through an external terminal (node N2). The NMOS transistor M3 is coupled in parallel across the diode D1 to function as a synchronous rectifier transistor (i.e., control is exercised so that this transistor is on when a forward current flows to the diode D1).

The oscillator circuit (waveform generator circuit) OSC1 not only outputs a trigger signal TRG at predetermined intervals to set a switching cycle, but also generates a sawtooth wave SAW having the same cycle as the switching cycle. The pre-driver circuits PD1-PD3 respectively drive the gates of the NMOS transistors M1-M3. The control logic circuit LOG performs a predefined process upon receipt of a control signal CO1 from the charge control circuit CGCTL, a control signal CO2 from the discharge control circuit DCGCTL, and a trigger signal TRG from the oscillator circuit OSC1, and provides on/off control of the NMOS transistors M1-M3 through the pre-driver circuits PD1-PD3. The control logic circuit LOG and the pre-driver circuits PD1-PD3 correspond to the switch control circuit SWCTL shown in FIG. 1.

The current detection circuit SA1 detects an inductor current IL flowing in the inductor L0, and generates a current detection signal CS having a voltage level proportional to the level of the inductor current IL. The current detection circuit SA1 converts the inductor current IL to a voltage by using the on-resistance of the NMOS transistor M2 and generates the current detection signal CS. The operational amplifier circuit (first operational amplifier circuit) OP1 is a non-inverting operational amplifier circuit, and is configured to not only amplify the output power supply voltage Von by a gain predetermined by resistors R1, R2, but also adjust the central voltage level of its output in accordance with a reference voltage Vref2. The operational amplifier circuit (second operational amplifier circuit) OP2 is an inverting operational amplifier circuit, and is configured to not only amplify the output power supply voltage Vop by a gain predetermined by resistors R3, R4, but also adjust the central voltage level of its output in accordance with a reference voltage Vref3.

The charge control circuit CGCTL includes an addition circuit ADD, an error amplifier circuit (first error detection circuit) EA1, and a comparator circuit (first comparator circuit) CMP1. The addition circuit ADD generates a feedback signal FB having a predetermined voltage level by adding the output voltage level of the operational amplifier circuit OP1 to the output voltage level of the operational amplifier circuit OP2. The error amplifier circuit EA1 detects an error between a predetermined reference voltage Vref1 and the voltage level of the feedback signal FB and changes the voltage level of an error output signal EO1 in accordance with the magnitude of the error. The error amplifier circuit EA1 is formed by a current amplifier circuit (first differential amplifier circuit) AMP1 and a resistor Rx1. The current amplifier circuit AMP1 generates an output current, which is obtained by multiplying an input difference voltage (FB−Vref1) by a mutual conductance gm. The resistor Rx1 generates the error output signal EO1 by converting the generated output current to a voltage. The comparator circuit CMP1 compares the voltage level of the error output signal EO1 with the voltage level of the current detection signal CS. When the voltage level of the current detection signal CS reaches the voltage level of the error output signal EO1, the comparator circuit CMP1 outputs the control signal CO1.

The discharge control circuit DCGCTL includes an error amplifier circuit (second error detection circuit) EA2 and a comparator circuit (second comparator circuit) CMP2. The error amplifier circuit EA2 detects the difference between the output voltage level of the operational amplifier circuit OP2 and the output voltage level of the operational amplifier circuit OP1 and changes the voltage level of an error output signal EO2 in accordance with the magnitude of the difference. The error amplifier circuit EA2 is formed by a current amplifier circuit (second differential amplifier circuit) AMP2 and a resistor Rx2. The current amplifier circuit AMP2 generates an output current, which is obtained by multiplying the output voltage level difference between the operational amplifier circuits OP1 and OP2 (output voltage level of OP2−output voltage level of OP1) by the mutual conductance gm. The resistor Rx2 generates the error output signal EO2 by converting the generated output current to a voltage. The comparator circuit CMP2 compares the voltage level of the sawtooth wave SAW from the oscillator circuit OSC1 with the voltage level of the error output signal EO2, and outputs the control signal CO2.

Although not specifically defined, referring to FIG. 7, the power supply voltage VIN is about 5 V, the output power supply voltage Vop is about 28 V, and the output power supply voltage Von is about −3 V. In this instance, as the positive output power supply voltage Vop is high, the diode D2 is not provided with a synchronous rectifier transistor from the viewpoint of the maximum operating voltage of the device. However, such a transistor may be provided for the diode D2 to reduce the loss due to the diode D2. Further, referring to FIG. 7, the values of the reference voltages Vref1-Vref3 are adjusted as needed within a range, for instance, of 1.0 V to 3.3 V. For example, the operational amplifier circuit OP1 is configured to operate from a positive power supply voltage and detect an input output power supply voltage (negative voltage) Von by using the positive power supply voltage.

Figure 8:
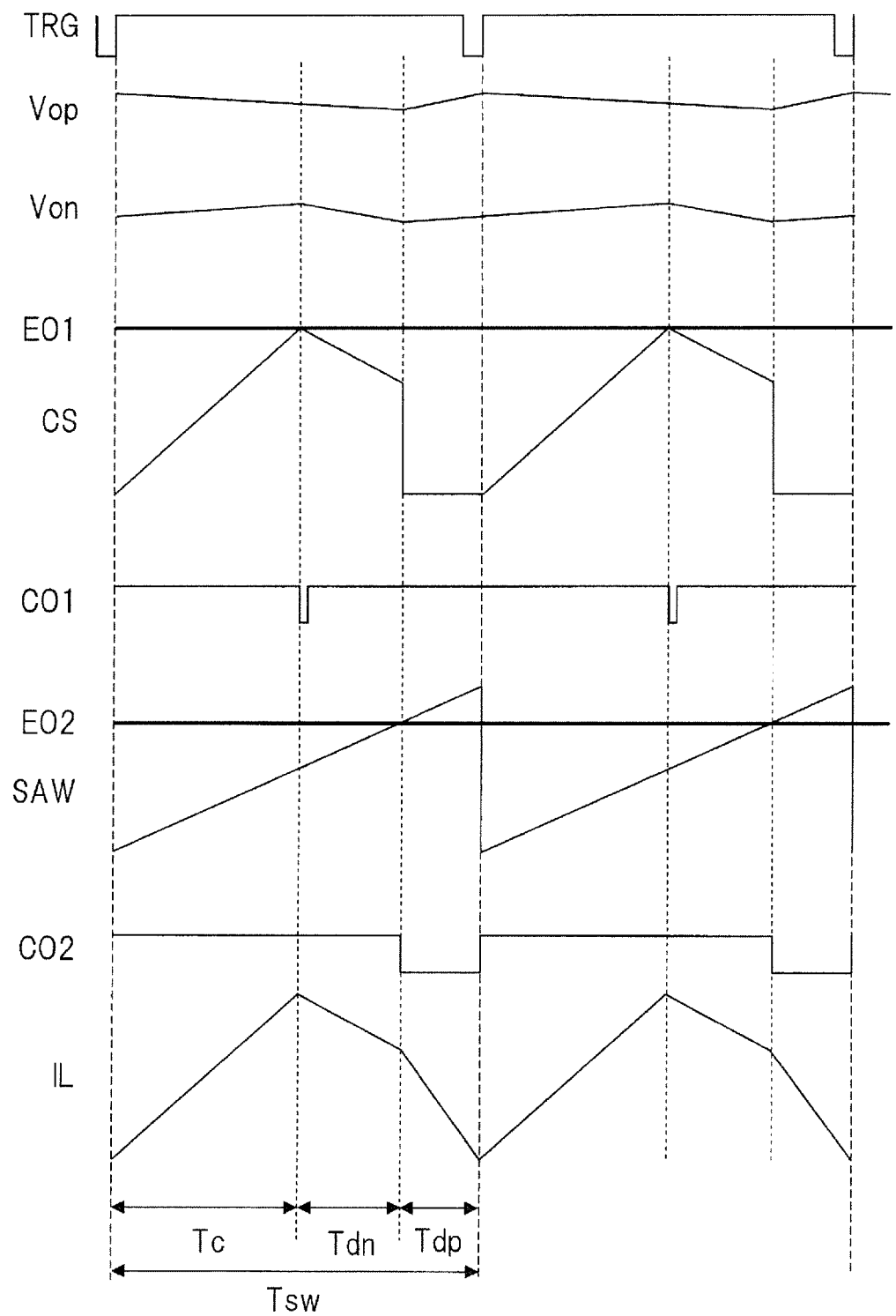
FIG. 8 is a waveform illustrating an exemplary steady-state operation of the power supply device shown in FIG. 7.

FIG. 8 is a waveform illustrating an exemplary steady-state operation of the power supply device shown in FIG. 7. As shown in FIG. 8, the control logic circuit LOG exercises control, upon receipt of the trigger signal TRG (an "L" pulse signal in this instance), to turn on the NMOS transistors M1, M2, thereby initiating the charge period Tc. During the charge period Tc, the inductor current IL increases at a predetermined gradient, thereby causing the voltage level of the current detection signal CS to increase accordingly. The comparator circuit CMP1 in the charge control circuit CGCTL outputs the control signal CO1 (an "L" pulse signal in this instance) when the voltage level of the current detection signal CS reaches the voltage level of the error output signal EO1. Upon receipt of the control signal CO1, the control logic circuit LOG exercises control to turn off the NMOS transistor M1 and turn on the NMOS transistor M2. This causes the charge period Tc to end and the negative voltage side discharge period Tdn to start. The above-described method of controlling the charge period Tc is called a peak current control method.

During the negative voltage side discharge period Tdn, the inductor current IL decreases at a predetermined gradient, thereby causing the voltage level of the current detection signal CS to decrease accordingly. Meanwhile, the comparator circuit CMP2 in the discharge control circuit DCGCTL outputs a high level as the control signal CO2 when the voltage level of the sawtooth wave SAW is lower than that of the error output signal EO2. When, on the other hand, the voltage level of the sawtooth wave SAW is higher than that of the error output signal EO2, the comparator circuit CMP2 outputs a low level as the control signal CO2. When the control signal CO2 shifts from the high level to the low level, the control logic circuit LOG exercises control to turn on the NMOS transistor M1 and turn off the NMOS transistor M2. This causes the negative voltage side discharge period Tdn to end and the positive voltage side discharge period Tdp to start. The positive voltage side discharge period Tdp ends when the next trigger signal TRG is input. This causes the charge period Tc within the next switching cycle Tsw to start. It should be noted that the control signal CO2 remains at the low level during the positive voltage side discharge period Tdp.

If the voltage level (central voltage level) prevailing when the output power supply voltage (negative voltage) Von is equal to a target value is Vnc, the output voltage level of the operational amplifier circuit OP1 shown in FIG. 7 increases above Vnc when the output power supply voltage (negative voltage) Von is higher than the target value (i.e., the value Von has not reached the target value). When, on the contrary, the output power supply voltage (negative voltage) Von is lower than the target value (i.e., the value Von has exceeded the target value), the output voltage level of the operational amplifier circuit OP1 shown in FIG. 7 decreases below Vnc. Therefore, when the output voltage level of the operational amplifier circuit OP1 is equal to "Vnc+ΔVn", ΔVn takes a positive value in which a shortfall is reflected or takes a negative value in which an excess is reflected.

Meanwhile, if the voltage level (central voltage level) prevailing when the output power supply voltage Vop is equal to a target value is Vpc, the output voltage level of the operational amplifier circuit OP2 increases above Vpc when the output power supply voltage Vop is lower than the target value (i.e., the value Vop has not reached the target value). When, on the contrary, the output power supply voltage Vop is higher than the target value (i.e., the value Vop has exceeded the target value), the output voltage level of the operational amplifier circuit OP2 decreases below Vpc. Therefore, when the output voltage level of the operational amplifier circuit OP2 is equal to "Vpc+ΔVp", ΔVp takes a positive value in which a shortfall is reflected or takes a negative value in which an excess is reflected. As such being the case, a combination of a non-inverting operational amplifier circuit and an inverting operational amplifier circuit is employed as the combination of the operational amplifier circuits OP1, OP2 in order to match the polarities of the output voltage levels of the operational amplifier circuits OP1, OP2 depending on whether an excess or a shortfall is encountered.

The addition circuit ADD uses resistors Rfbn, Rfbp to provide resistive voltage division between the aforementioned output voltage level of the operational amplifier circuit OP1 and the aforementioned output voltage level of the operational amplifier circuit OP2 for the purpose of generating the feedback signal FB at an associated resistive voltage divider node coupling the resistors. When the output voltage level of the operational amplifier circuit OP1 is equal to "Vnc+ΔVn" and the output voltage level of the operational amplifier circuit OP2 is equal to "Vpc+ΔVp" as mentioned earlier, the voltage level of the feedback signal FB changes in accordance with the values of ΔVn and ΔVp with reference to a voltage level prevailing when the output voltage level of the operational amplifier circuit OP1 is Vnc and the output voltage level of the operational amplifier circuit OP2 is Vpc (i.e., prevailing in a steady state). For example, if the values ΔVn and ΔVp are positive (i.e., the values Von and Vop are insufficient), the voltage level of the feedback signal FB increases in accordance with the sum of these positive values, and if the values ΔVn and ΔVp are negative (i.e., the values Von and Vop are excessive), the voltage level of the feedback signal FB decreases in accordance with the sum of these negative values. Further, if either one of the values ΔVn and ΔVp is positive and the other is negative (i.e., either one of the values Von and Vop is insufficient and the other is excessive), the voltage level of the feedback signal FB increases or decreases in accordance with the balance between the above-mentioned positive and negative values (the sum of the above-mentioned positive and negative values).

In the steady state (the output power supply voltages Von, Vop are both equal to their target values) shown in FIG. 8, the output voltage level of the operational amplifier circuit OP1 is Vnc and the output voltage level of the operational amplifier circuit OP2 is Vpc. Thus, the voltage level of the feedback signal FB is equal to a voltage level corresponding to the values Vnc and Vpc. The error amplifier circuit EA1 receives the voltage level of the feedback signal FB in the steady state at a positive input node (+) and performs an amplifying operation to generate the error output signal EO1 representing a voltage level corresponding to a case where the values Von and Vop are both equal to their target values.

If, on the other hand, there is an error between the voltage levels of the output power supply voltages Von, Vop and their target values, the operational amplifier circuits OP1, OP2 generate the values ΔVn and ΔVp. The addition circuit ADD then changes the voltage level of the feedback signal FB in accordance with the sum of the values ΔVn and ΔVp. In this instance, the voltage level of the feedback signal FB increases to the extent that the output power supply voltages Von, Vop are insufficient. Thus, the voltage level of the error output signal EO1 increases through the error amplifier circuit EA1. The comparator circuit CMP1 controls the length of the charge period Tc in accordance with the voltage level of the error output signal EO1. Consequently, in accordance with the sum of the amount of error of the output power supply voltage Von from its target value and the amount of error of the output power supply voltage Vop from its target value, the charge control circuit CGCTL controls the amount of electrical power to be charged into the inductor L0.

Further, in the steady state (the output power supply voltages Von, Vop are both equal to their target values) shown in FIG. 8, the error amplifier circuit EA2 receives the output voltage levels Vnc, Vpc of the operational amplifier circuits OP1, OP2, generates a predetermined voltage level as the error output signal EO2, and sets a predetermined value as the length ratio between the negative voltage side discharge period Tdn and positive voltage side discharge period Tdp shown in FIG. 8. Meanwhile, if there is an error between the voltage levels of the output power supply voltages Von, Vop and their target values, the operational amplifier circuits OP1, OP2 generates the values ΔVn and ΔVp as described earlier, and the error amplifier circuit EA2 controls the voltage level of the error output signal EO2 as described under sections (A) to (E) presented below in accordance with a value obtained by subtracting ΔVp from ΔVn.

(A) If ΔVn=ΔVp (i.e., the output power supply voltages Von, Vop are both excessive by the same amount or insufficient by the same amount), the voltage level of the error output signal EO2 remains unchanged. Consequently, the ratio between the negative voltage side discharge period Tdn and the positive voltage side discharge period Tdp is the same as the ratio prevailing in the steady state.

(B) If ΔVn<0 or ΔVp>0 (i.e., the output power supply voltage Von is excessive or the output power supply voltage Vop is insufficient), the voltage level of the error output signal EO2 decreases in accordance with the magnitude of |ΔVn+ΔVp|. Consequently, as compared to the ratio prevailing in the steady state, the negative voltage side discharge period Tdn is decreased and the positive voltage side discharge period Tdp is increased.

(C) If ΔVn>0 or ΔVp<0 (i.e., the output power supply voltage Von is insufficient or the output power supply voltage Vop is excessive), the voltage level of the error output signal EO2 increases in accordance with the magnitude of |ΔVn+ΔVp|. Consequently, as compared to the ratio prevailing in the steady state, the negative voltage side discharge period Tdn is increased and the positive voltage side discharge period Tdp is decreased.

(D) If ΔVn>ΔVp>0 (i.e., the output power supply voltages Von, Vop are both insufficient and the output power supply voltage Von is more insufficient than the output power supply voltage Vop), the voltage level of the error output signal EO2 increases in accordance with the magnitude of |ΔVn−ΔVp|. Consequently, as compared to the ratio prevailing in the steady state, the negative voltage side discharge period Tdn is increased and the positive voltage side discharge period Tdp is decreased.

(E) If ΔVn<ΔVp<0 (i.e., the output power supply voltages Von, Vop are both excessive and the output power supply voltage Von is more excessive than the output power supply voltage Vop), the voltage level of the error output signal EO2 decreases in accordance with the magnitude of |ΔVn−ΔVp|. Consequently, as compared to the ratio prevailing in the steady state, the negative voltage side discharge period Tdn is decreased and the positive voltage side discharge period Tdp is increased.

As described above, the discharge control circuit DCGCTL controls the ratio between the negative voltage side discharge period Tdn and the positive voltage side discharge period Tdp in accordance with the ratio between the amount of error (ΔVn) of the output power supply voltage Von from its target value and the amount of error (ΔVp) of the output power supply voltage Vop from its target value. In other words, the discharge control circuit DCGCTL controls the distribution ratio at which the electrical power discharged from the inductor L0 is distributed to the capacitors Cn, Cp in a time-division manner.

Figure 9:
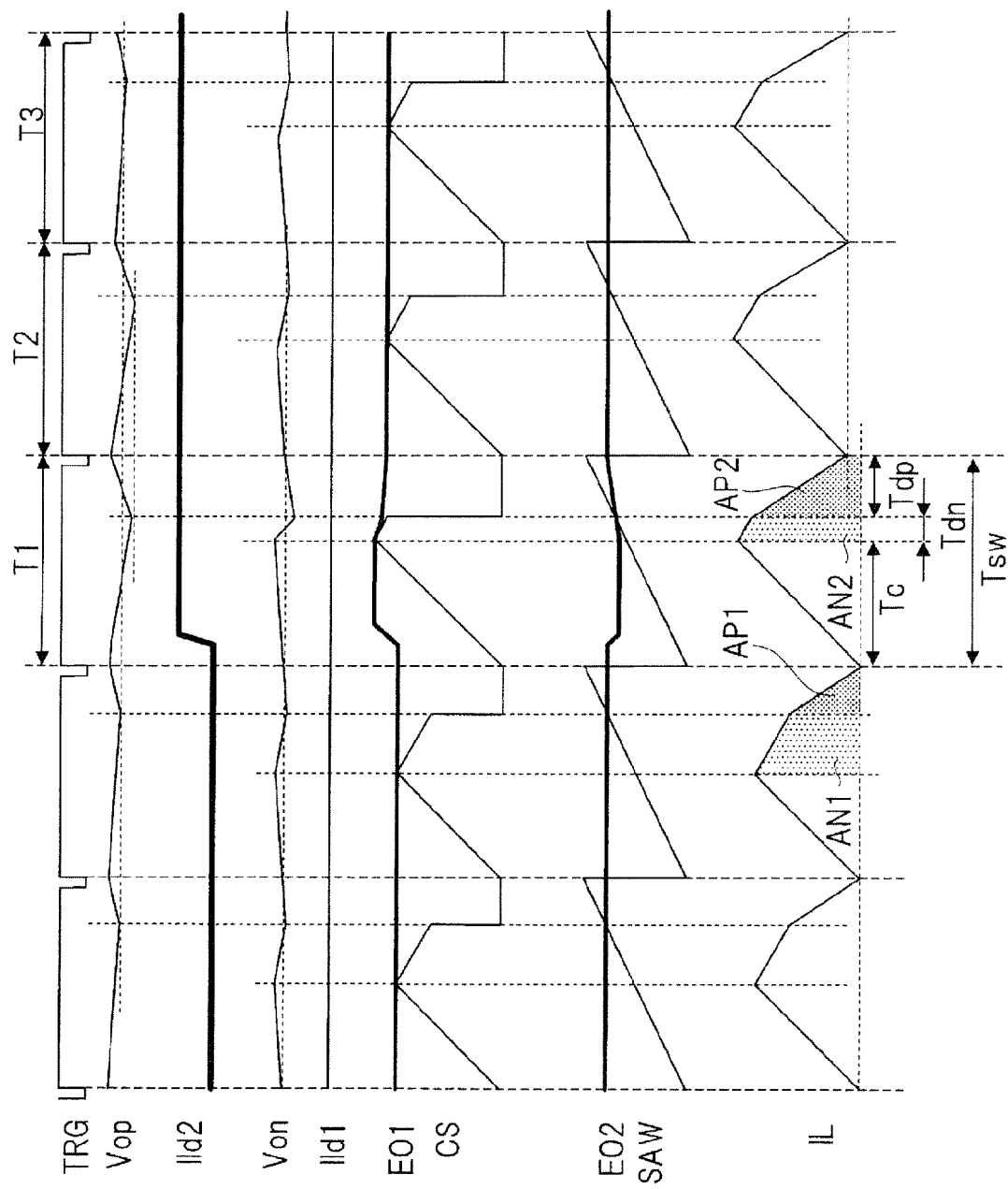
FIG. 9 is a waveform illustrating load change characteristics of the power supply device shown in FIG. 7.

FIG. 9 is a waveform illustrating load change characteristics of the power supply device shown in FIG. 7, for example, if a positive voltage side load current is increased. Referring to FIG. 7, a load current Ild2 is supplied to the positive voltage side load LD2. As indicated within a period T1 shown in FIG. 9, an increase in the load current Ild2 accelerates a decrease in the output power supply voltage Vop so that the output power supply voltage Vop is below its target value. As a result, the voltage level of the error output signal EO1 increases, whereas the voltage level of the error output signal EO2 decreases. When the voltage level of the error output signal EO1 increases, the charge period Tc increases to increase the peak value of the inductor current IL. This increases the amount of electrical power to be charged into the inductor L0.

Meanwhile, the decrease in the voltage level of the error output signal EO2 increases the ratio of the positive voltage side discharge period Tdp and decreases the ratio of the negative voltage side discharge period Tdn. As a result, the increase in the amount of electrical power to be charged into the inductor L0 is mostly distributed to the positive voltage side discharge period Tdp. In other words, referring to FIG. 9, the area of a region AP2 increases compared to the area of a region AP1, while the area of a region AN2 decreases compared to the area of a region AN1. Subsequently, as indicated in periods T2, T3 of FIG. 9, the steady state is approached again while the amount of offset for the inductor current IL is increased.

As described above, the use of the power supply device according to the third embodiment makes it possible to obtain the various effects described in conjunction with the first embodiment, implement the various effects with a simple configuration, and further improve responsiveness. In other words, the exemplary configuration shown in FIG. 7 is achieved by using the current amplifier circuits AMP1, AMP2 and the resistors Rx1, Rx2, and does not resort to integral control that is exercised through a so-called loop filter (low-pass filter). This makes it possible, for example, to reduce the size and cost of the power supply device and improve the responsiveness to load changes.

The power supply device shown in FIG. 1 is not limited to a circuit system employed in the exemplary configuration shown in FIG. 7, but may be implemented by using various other circuit systems. For example, an alternative is to install two error amplifiers in place of the operational amplifier circuits OP1, OP2, apply a target value of the output power supply voltage Von to one of the error amplifiers, amplify the error between the output power supply voltage Von and its target value, apply a target value of the output power supply voltage Vop to the other error amplifier, and amplify the error between the output power supply voltage Vop and its target value. However, in some cases, the target value of the output power supply voltage Von may be a negative voltage and the target value of the output power supply voltage Vop may be a high voltage. It is therefore preferred that the employed circuit configuration be simplified by adopting a configuration in which, for example, the operational amplifier circuits OP1, OP2 shown in FIG. 7 perform level conversion to obtain an appropriate positive voltage level.

Further, as indicated in FIG. 8, the third embodiment uses the sawtooth wave SAW that increases at a positive gradient within the switching cycle Tsw. However, an alternative, for example, is to use a sawtooth wave that decreases at a negative gradient or use a sawtooth wave that increases at a positive gradient within the negative voltage side discharge period Tdn and the positive voltage side discharge period Tdp upon receipt of the control signal CO1. In other words, any waveform may be used as far as it changes at a predetermined gradient within the negative voltage side discharge period Tdn and the positive voltage side discharge period Tdp.

Furthermore, the third embodiment, which has been described above, is configured to include analog circuitry. Alternatively, however, a digital circuit may be used in place of a portion of the analog circuitry and components. For example, an alternative is to convert the output power supply voltages Von, Vop to digital values with an analog-to-digital conversion circuit, digitally calculate the error between each resulting digital value and its target value, reflect the calculated error in the setting, for instance, of a counter circuit, and determine the lengths of the charge period Tc, the negative voltage side discharge period Tdn, and the positive voltage side discharge period Tdp. In general, a desired response speed may not always be attained during the use of a digital circuit due, for instance, to the rate of conversion provided by the analog-to-digital conversion circuit. However, the control method employed by the present embodiment, which is applied, for instance, to an addition process and to a distribution ratio determination process, is appropriate in principle for digital processing. Therefore, the configuration of the third embodiment can also be beneficially achieved by using a digital circuit.

Moreover, the exemplary configuration shown in FIG. 7 is such that the output power supply voltages Vop, Von are both generated. However, an alternative, for example, is to provide a mode for generating both of the two output power supply voltages and a mode for generating only one of the two output power supply voltages. In this instance, the amount of power consumption can be reduced by switching from one mode to another during a practical use if, for instance, either one of the loads LD1, LD2 remains inoperative for a predetermined period. More specifically, referring to FIG. 7, the power consumption can be reduced, for instance, by using a circuit that opens one input of the addition circuit ADD or sets one input of the addition circuit ADD to a predetermined fixed voltage upon receipt of a mode setup signal for generating only one output power supply voltage and by using a circuit that fixes the control signal CO2 from the comparator circuit CMP2 at either the high level or the low level. This ensures that either one of the output power supply voltages is generated within the switching cycle having one charge period and one discharge period.

Fourth Embodiment

A fourth embodiment of the present invention will now be described with reference to a modified version of the power supply device shown in FIG. 7, which is described in conjunction with the third embodiment.

Figure 10:
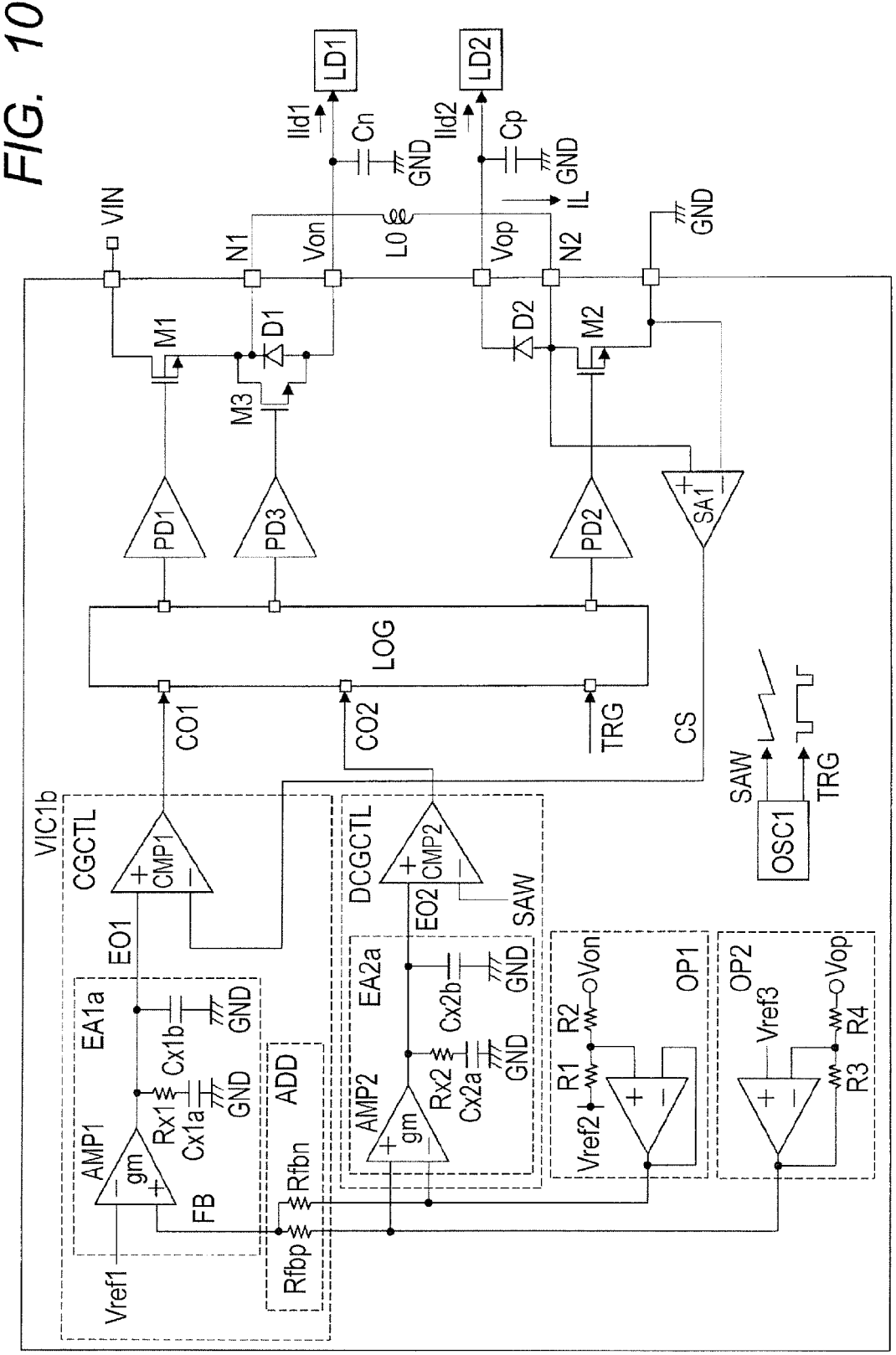
FIG. 10 is a circuit diagram illustrating an exemplary configuration of a power supply device according to a fourth embodiment of the present invention.

FIG. 10 is a circuit diagram illustrating an exemplary configuration of the power supply device according to the fourth embodiment of the present invention. The power supply device shown in FIG. 10 differs from the power supply device shown in FIG. 7 in that a loop filter is used in each of two error amplifier circuits (first and second error detection circuits) EA1a, EA2a included in a power supply control device VIC1b. The other elements of the power supply device shown in FIG. 10 will not be described in detail because they are the same as those of the power supply device shown in FIG. 7. The loop filter in the error amplifier circuit EA1a includes a lag-lead filter, which is formed by a resistor Rx1 and a capacitor Cx1a, and a lag filter, which is formed by a capacitor Cx1b. The loop filter in the error amplifier circuit EA2a includes a lag-lead filter, which is formed by a resistor Rx2 and a capacitor Cx2a, and a lag filter, which is formed by a capacitor Cx2b.

In some cases, the above-described loop filters are available, for example, as external parts. Therefore, the use of the loop filters may increase the size and cost of the power supply device, as mentioned in conjunction with the third embodiment, and reduce the responsiveness to load changes due to integral control. However, the power supply device shown in FIG. 10 may, in some cases, exhibit increased control stability, for instance, by providing improved noise immunity although it exhibits lower responsiveness than the power supply device shown in FIG. 7. From this point of view, it can be said that the power supply device according to the fourth embodiment produces beneficial effects.

Fifth Embodiment

A fifth embodiment of the present invention will now be described with reference to another modified version of the power supply device shown in FIG. 7, which is described in conjunction with the third embodiment.

Figure 11:
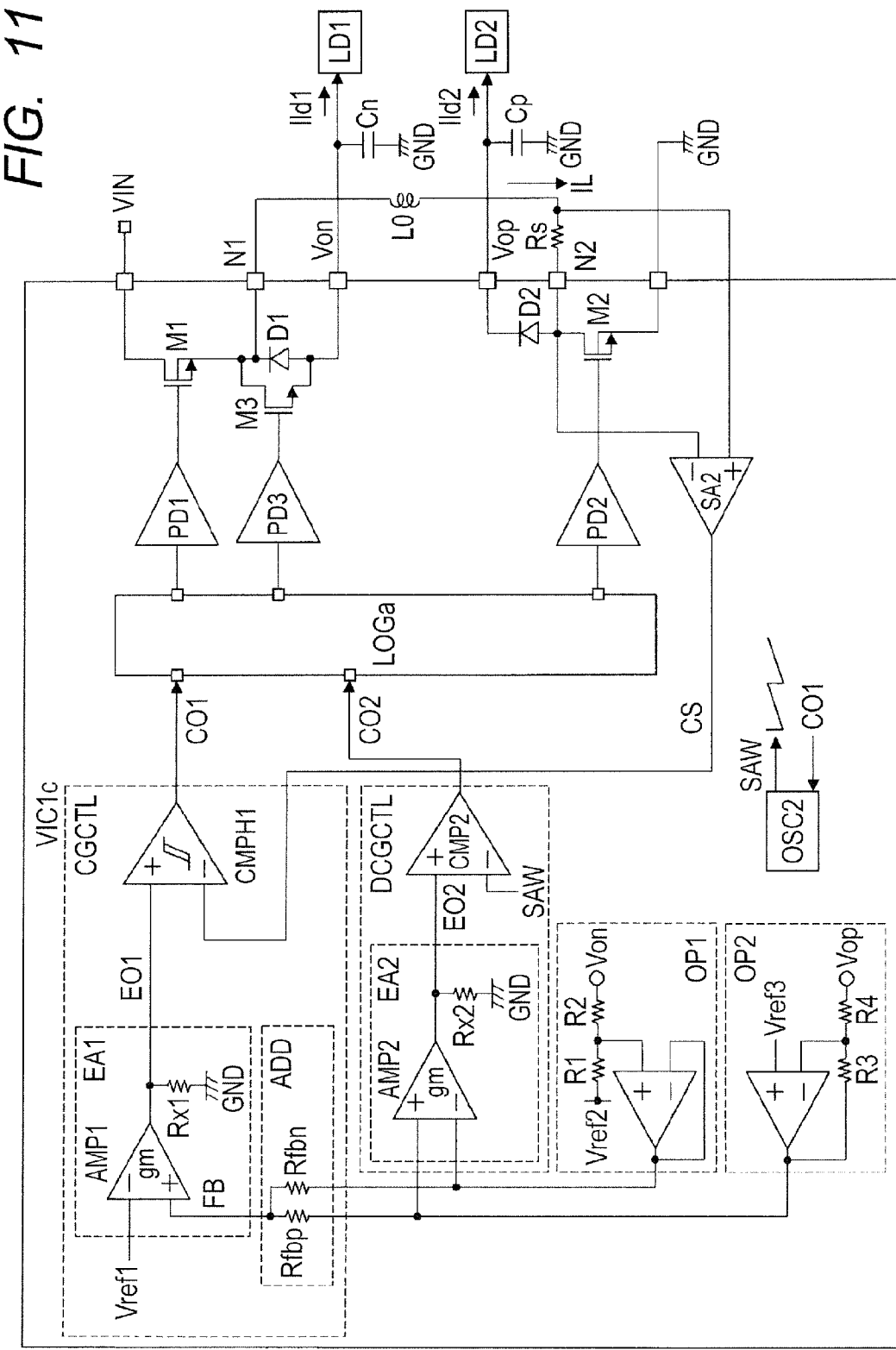
FIG. 11 is a circuit diagram illustrating an exemplary configuration of a power supply device according to a fifth embodiment of the present invention.

FIG. 11 is a circuit diagram illustrating an exemplary configuration of the power supply device according to the fifth embodiment of the present invention. The power supply device shown in FIG. 11 differs from the power supply device shown in FIG. 7 in that a hysteresis comparator circuit CMPH1 is used in the charge control circuit CGCTL of a power supply control device VIC1c. Accordingly, the power supply device shown in FIG. 11 also differs from the power supply device shown in FIG. 7 in that a current detection resistor Rs is installed external to the power supply control device VIC1c. Further, the power supply device shown in FIG. 11 also differs from the power supply device shown in FIG. 7 in the location of the input point of a current detection circuit SA2, in the function of an oscillator circuit OSC2, and in the function of a control logic circuit LOGa. The other elements of the power supply device shown in FIG. 11 will not be described in detail because they are the same as those of the power supply device shown in FIG. 7.

Figure 12:
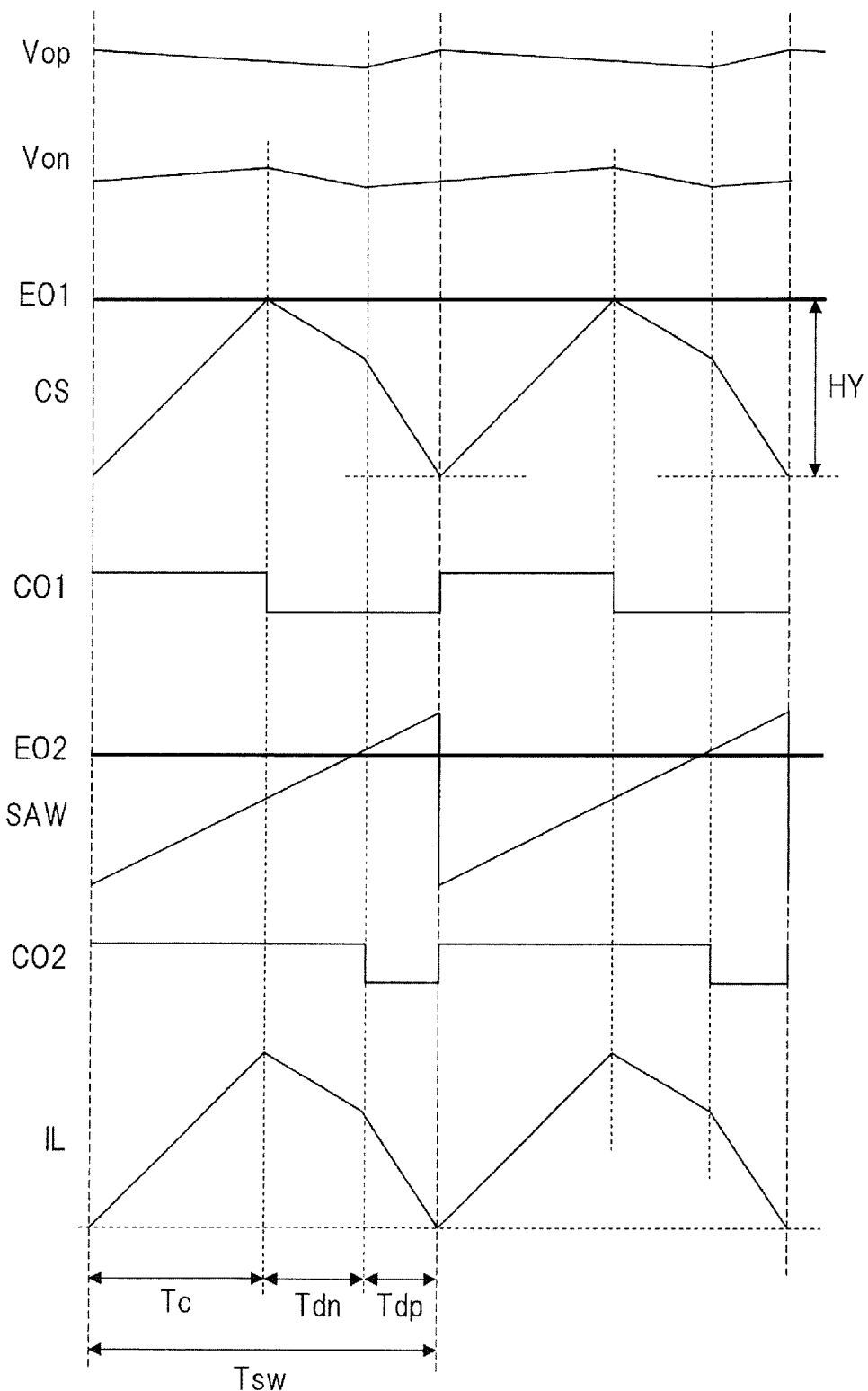
FIG. 12 is a waveform illustrating steady-state operation of the power supply device shown in FIG. 11.

FIG. 12 is a waveform illustrating an exemplary steady-state operation of the power supply device shown in FIG. 11. As shown in FIG. 12, the hysteresis comparator circuit CMPH1 changes the control signal CO1 from the high level to the low level when the voltage level of the current detection signal CS from the current detection circuit SA2 reaches the voltage level of the error output signal EO1 from the error amplifier circuit EA1. Subsequently, the hysteresis comparator circuit CMPH1 changes the control signal CO1 from the low level to the high level when the voltage level of the current detection signal CS decreases from a voltage level (the voltage level of the error output signal EO1) prevailing when the control signal CO1 is changed from the high level to the low level by a voltage level HY based on predetermined hysteresis characteristics.

The control logic circuit LOGa controls the charge period Tc while the control signal CO1 is at the high level, and controls the discharge periods (Tdn, Tdp) while the control signal CO1 is at the low level. As described above, when the hysteresis comparator circuit CMPH1 is used, the switching cycle Tsw is determined in accordance with the voltage level of the error output signal EO1 and with the hysteresis characteristics (HY) of the hysteresis comparator circuit CMPH1, and is a variable cycle different from the fixed cycle shown in FIG. 7.

When the above-described configuration is adopted to perform the above-described operation, unlike the case shown in FIG. 7, the current detection circuit SA2 needs to be used to detect the inductor current IL during the discharge periods (Tdn, Tdp) as well as generate the current detection signal CS. When the exemplary configuration shown in FIG. 7 is used, it is difficult to detect a current during a period during which no current flows to the NMOS transistor M2. Therefore, in the exemplary configuration shown in FIG. 11, the current detection resistor Rs is disposed in series with the inductor L0 to let the current detection circuit SA2 detect the potential difference across the resistor Rs. Further, the oscillator circuit OSC2 recognizes the switching cycle Tsw in accordance with the control signal CO1 and generates a sawtooth wave SAW having the same cycle as the switching cycle Tsw.

As described above, the use of the power supply device according to the fifth embodiment makes it possible to obtain the various effects described in conjunction with the first embodiment, further simplify the employed circuitry, and further improve responsiveness. When, for instance, current mode control having the fixed cycle shown in FIG. 7 is exercised, the output power supply voltages Von, Vop change to become insufficient while electrical power is charged into the inductor L0. This increases the magnitude of the error output signal EO1 accordingly. As a result, an on-duty ratio (=Tc/Tsw) may increase in some cases. When the on-duty ratio increases to a predetermined value or greater, a phenomenon called "subharmonic oscillation" occurs. To address this problem, it is necessary to use a slope compensation circuit and increase the length of the fixed cycle to a certain extent. Meanwhile, if hysteresis control is exercised as indicated in FIG. 11, such a slope compensation circuit need not be used because the hysteresis control yields a variable cycle. This makes it possible to simplify the employed circuitry. Further, when the fixed cycle is employed, a response delay time corresponding to the fixed cycle occurs at all times. When the variable cycle is employed, on the other hand, the response delay time changes optimally depending on the situation. As a result, responsiveness can be improved.

Sixth Embodiment

A sixth embodiment of the present invention will now be described by giving further details of the power supply device shown in FIG. 4, which has been described in conjunction with the second embodiment.

Figure 13:
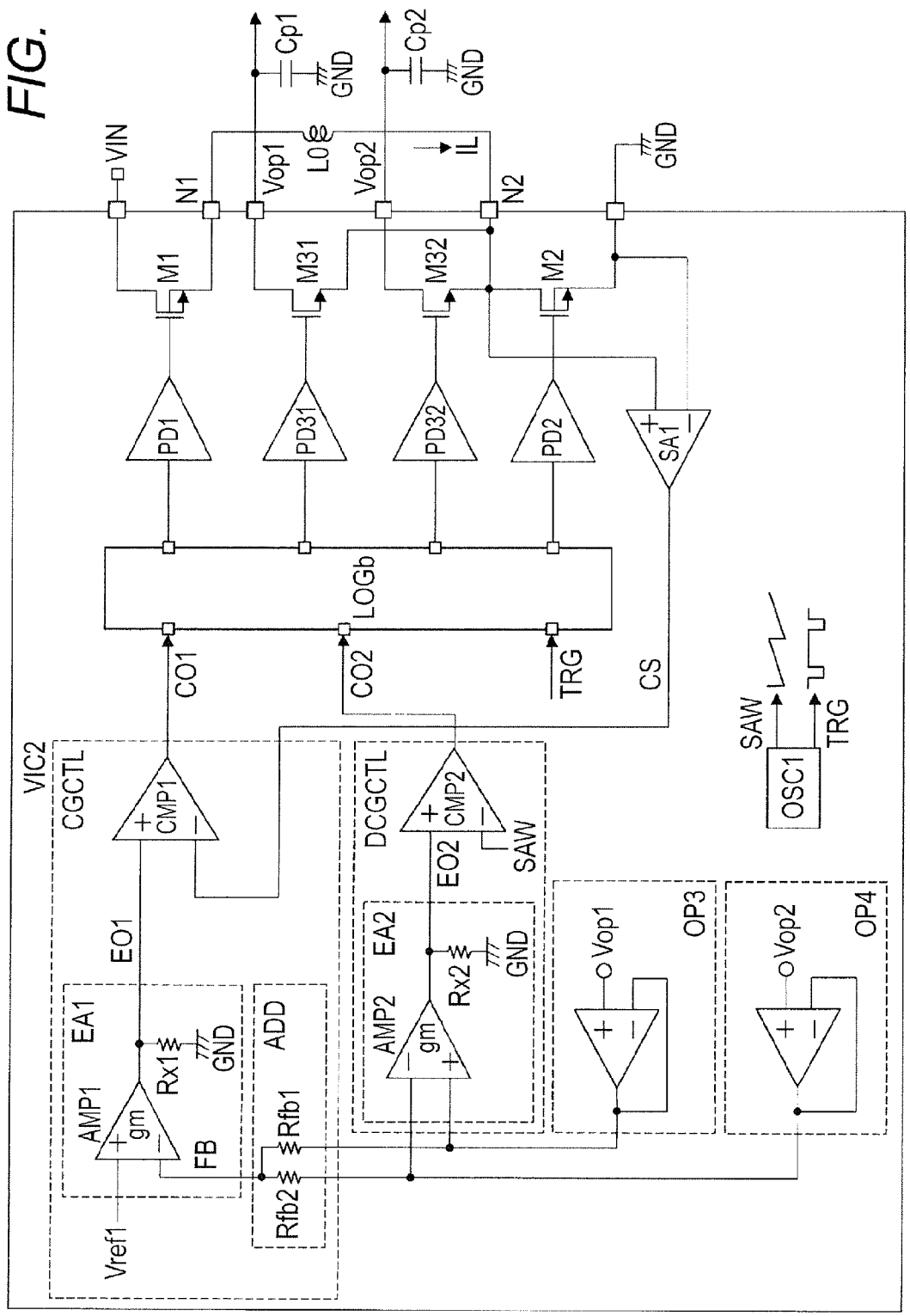
FIG. 13 is a circuit diagram illustrating an exemplary configuration of a power supply device according to a sixth embodiment of the present invention.

FIG. 13 is a circuit diagram illustrating an exemplary configuration of the power supply device according to the sixth embodiment of the present invention. The power supply device shown in FIG. 13 includes, for example, a power supply control device VIC2, an inductor L0, and capacitors Cp1, Cp2. The power supply control device VIC2 is formed on a semiconductor chip. The inductor L0 and the capacitors Cp1, Cp2 are parts external to the power supply control device VIC2. Output power supply voltages Vop1, Vop2 are respectively generated in the capacitors Cp1, Cp2, as is the case shown in FIG. 4. The power supply control device VIC2 includes a control logic circuit LOGb, pre-driver circuits PD1, PD2, PD31, PD32, NMOS transistors M1, M2, M31, M32, a current detection circuit SA1, a charge control circuit CGCTL, a discharge control circuit DCGCTL, operational amplifier circuits OP3, OP4, and an oscillator circuit OSC1. The NMOS transistors M1, M2, M31, M32 respectively correspond to the switches SW1, SW2, SW31, SW32 shown in FIG. 4.

The current detection circuit SA1, the charge control circuit CGCTL, the discharge control circuit DCGCTL, and the oscillator circuit OSC1 have the same configurations and perform the same operations as indicated in FIG. 7. The control logic circuit LOGb controls the NMOS transistors as appropriate upon receipt of the control signals CO1, CO2 and the trigger signal TRG, as is the case shown in FIG. 7. However, the control logic circuit LOGb provides on/off control of the NMOS transistors M1, M2, M31, M32 through the pre-driver circuits PD1, PD2, PD31, PD32 as indicated in FIG. 5. In such an instance, as is the case shown in FIG. 7, the trigger signal TRG and the control signal CO1 control the charge period Tc shown in FIG. 5, and the control signal CO2 controls the ratio between the positive voltage side discharge period Tdp1 and the subsequent positive voltage side discharge period Tdp2 shown in FIG. 5.

Referring to FIG. 13, the operational amplifier circuits OP3, OP4 are used in place of the operational amplifier circuits OP1, OP2 shown in FIG. 7. The operational amplifier circuits OP3, OP4 are voltage follower circuits. The operational amplifier circuit OP3 outputs the voltage level of the output power supply voltage Vop1, whereas the operational amplifier circuit OP4 outputs the voltage level of the output power supply voltage Vop2. As the output power supply voltages Vop1, Vop2 are both positive voltages, the polarity of one of the two output power supply voltages need not be inverted, unlike the case shown in FIG. 7.

Seventh Embodiment

A seventh embodiment of the present invention will now be described with reference to a case where the power supply device shown in FIG. 7, which is described in conjunction with the third embodiment, is applied to a storage system (hard disk system).

Figure 14:
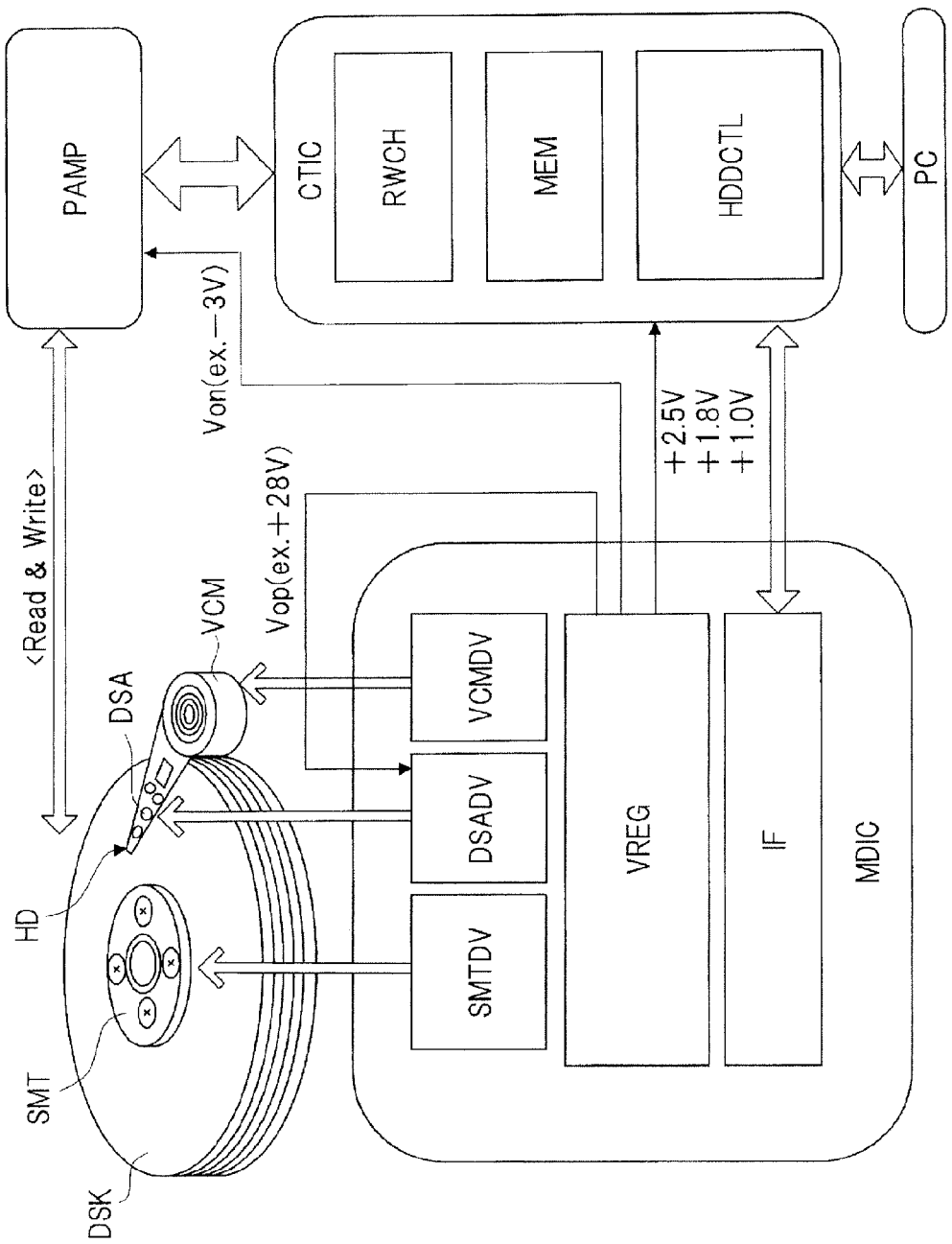
FIG. 14 is a schematic block diagram illustrating an exemplary configuration of a hard disk system to which a power supply device according to a seventh embodiment of the present invention is applied.

FIG. 14 is a schematic block diagram illustrating an exemplary configuration of a hard disk system to which the power supply device according to the seventh embodiment of the present invention is applied. The hard disk system shown in FIG. 14 includes, for example, a magnetic disk DSK, a spindle motor SMT, a magnetic head HD, a dual stage actuator DSA, a voice coil motor VCM, a motor control device MDIC, a preamplifier PAMP, a hard disk control device CTIC, and a personal computer PC. The spindle motor SMT rotates the magnetic disk DSK. The voice coil motor VCM moves the magnetic head HD over the magnetic disk DSK. The dual stage actuator DSA minutely moves the magnetic head HD over the magnetic disk DSK. The magnetic head HD performs a write operation or a read operation at a specified position of the magnetic disk DSK.

In recent years, hard disk systems control the position of the magnetic head HD with increased accuracy as the storage density of the magnetic disk DSK increases. As such being the case, the hard disk system shown in FIG. 14 includes the dual stage actuator DSA in addition to the voice coil motor VCM,. The dual stage actuator DSA can provide position control with higher accuracy than the voice coil motor VCM. The dual stage actuator DSA is implemented, for instance, by a piezoelectric element. In general, a high positive voltage is required for controlling the piezoelectric element.

The motor control device MDIC is implemented, for instance, by a semiconductor chip, and includes a spindle motor driver SMTDV, a dual stage actuator driver DSADV, a voice coil motor driver VCMDV, a power supply regulator VREG, and an interface IF. The spindle motor driver SMTDV drives the spindle motor SMT. The dual stage actuator driver DSADV drives the dual stage actuator DSA. The voice coil motor driver VCMDV drives the voice coil motor VCM. The power supply regulator VREG includes a power supply control device VIC1a shown, for instance, in FIG. 7 and generates an output power supply voltage Vop (e.g., 28 V) and an output power supply voltage Von (e.g., −3 V). The output power supply voltage Vop is supplied to the dual stage actuator driver DSADV and used to drive the dual stage actuator DSA. The power supply regulator VREG further includes, for example, a step-down switching regulator and generates power supply voltages for the hard disk control device CTIC, such as 2.5 V, 1.8 V, and 1.0 V. The interface IF provides communication with the hard disk control device CTIC.

The hard disk control device CTIC is implemented, for instance, by a semiconductor chip, and includes a read/write channel RWCH, a memory MEM, and a hard disk control circuit HDDCTL. The hard disk control device CTIC operates from CTIC power, which is supplied from the motor control device MDIC. The read/write channel RWCH receives a data read command or a data write command from the personal computer PC and controls the preamplifier PAMP as appropriate in compliance with the received command. The hard disk control circuit HDDCTL receives address information pertaining to the data read command or data write command transmitted from the personal computer PC, and controls the motor control device MDIC. In other words, the hard disk control circuit HDDCTL controls the rotation of the magnetic disk DSK and the position of the magnetic head HD through the motor control device MDIC. The memory MEM is, for example, a RAM (Random Access Memory) and used as needed for processing performed by the read/write channel RWCH and the hard disk control circuit HDDCTL.

The preamplifier (read/write IC) PAMP is implemented, for instance, by a semiconductor chip. Upon receipt of a control signal from the read/write channel RWCH in the hard disk control device CTIC, the preamplifier PAMP drives the magnetic head HD to read data from the magnetic disk DSK or write data to the magnetic disk DSK. In this instance, the preamplifier PAMP drives the magnetic head HD by using the output power supply voltage Von (e.g., −3 V) from the motor control device MDIC. This negative voltage is used, for example, in combination with a positive voltage to keep the central potential of the magnetic head HD at a voltage close to 0 V.

When the above-described hard disk system is used, it is desirable that the number of external parts be decreased for the purpose of downsizing and cost reduction. Under such circumstances, generating a plurality of output power supply voltages with one inductor in accordance with a method provided by the present embodiment is beneficial. However, when the method provided by the present embodiment is used, the current supply capacity is relatively restricted as compared to a method of generating one output power supply voltage with one or more inductors. For example, as the hard disk control device CTIC requires a relatively large load current, the present embodiment is configured so that one or more inductors are used for each power supply to generate the electrical power for the hard disk control device CTIC. Further, the dual stage actuator DSA requires a stable power supply in order to provide high-precision position control. When the method provided by the present embodiment is used, the above-described requirements can be fulfilled because the speed of response can be increased as mentioned earlier. Although the present embodiment has been described on the assumption that it is applied to a hard disk system, the present embodiment is also applicable to various systems such as an organic EL display system.

While the present invention contemplated by its inventors has been described in detail in terms of preferred embodiments, it is to be understood that the present invention is not limited to those preferred embodiments, but extends to various modifications that nevertheless fall within the spirit and scope of the appended claims. For example, the foregoing preferred embodiments are described in detail for better understanding of the present invention. The present invention is not limited to embodiments that include all the elements described above. Some elements of an embodiment may be replaced by some elements of another embodiment or some elements of an embodiment may be added to the elements of another embodiment. Further, some elements of an embodiment may be subjected to the addition of other elements, deleted, or replaced by other elements.

What is claimed is:

1. A power supply device comprising:
a plurality of switches;
an inductor configured to charge and discharge electrical power in response to the plurality of switches;
a first capacitor configured to generate a first output power supply voltage with electrical power discharged from the inductor;
a second capacitor configured to generate a second output power supply voltage with electrical power discharged from the inductor;
a switch control circuit configured to control the plurality of switches so that electrical power is charged into the inductor, discharged from the inductor, and distributed to the first and second capacitors in a time-division manner based on a switching cycle;
a waveform generator circuit configured to generate a sawtooth wave having the same cycle as the switching cycle;
a first circuit configured to output a first output voltage level in response to the first output power supply voltage and an associated first reference voltage;
a second circuit configured to output a second output voltage level in response to the second output power supply voltage and an associated second reference voltage;
a first control circuit configured to control an amount of electrical power to be charged into the inductor based on a first error output signal reflective of a difference between: (i) a sum of the first and second output voltage levels, and (ii) a first predetermined reference voltage;
wherein the first control circuit includes:
a first current detection circuit configured to detect a current flowing in the inductor and generate a voltage level proportional to the current flowing in the inductor;
an addition circuit configured to generate a second voltage level by adding the first output voltage level to the second output voltage level;
a second error detection circuit configured to detect the first error between the first predetermined reference voltage and the second voltage level and change the output level based on the detected amount of the first error; and a second comparator circuit configured to compare the output level of the second error detection circuit to the voltage level of the first current detection circuit and control the amount of electrical power to be charged into the inductor based on a result of the comparison;

a second control circuit configured to control a distribution ratio at which electrical power discharged from the inductor is distributed to the first and second capacitors, based on a second output error signal reflective of a difference between: (i) the first output voltage level, and (ii) and second output voltage level; wherein the second control circuit includes:

a first error detection circuit configured to change the output level thereof based on a ratio between the first output voltage level and the second output voltage level; and a first comparator circuit configured to compare the sawtooth wave to the output level of the first error detection circuit and control the distribution ratio based on a result of the comparison;

wherein:

one of the first and second output power supply voltages is a positive voltage and the other is a negative voltage;

if the first and second output power supply voltages are both at their respective reference voltages, the first error detection circuit outputs a first voltage level;

if the first output power supply voltage has fallen short of the first reference voltage or the second output power supply voltage has exceeded the second reference voltage, the first error detection circuit changes the first voltage level in a predetermined direction of polarity based on the amount of shortfall or excess; and if the first output power supply voltage has exceeded the first reference voltage or the second output power supply voltage has fallen short of the second reference voltage, the first error detection circuit changes the first voltage level in a direction of polarity opposite to the predetermined direction of polarity based on the amount of shortfall or excess.

2. A power supply device comprising:

an inductor coupled between a first node and a second node;

a first switch coupled between the first node and a power supply voltage;

a second switch coupled between the second node and a ground power supply voltage;

a first diode having a cathode coupled to the first node;

a first capacitor coupled between the ground power supply voltage and an anode of the first diode so that a first output power supply voltage is generated therein;

a second diode having an anode coupled to the second node;

a second capacitor coupled between the ground power supply voltage and a cathode of the second diode so that a second output power supply voltage is generated therein;

a switch control circuit configured to control the first and second switches within a switching cycle including a first period, a second period subsequent to the first period, and a third period subsequent to the second period, so as to keep the first and second switches on during the first period, keep the first switch off and the second switch on during one of the second and third periods, and keep the first switch on and the second switch off during the other of the second and third periods, wherein the inductor is charged during the first period and is discharged during the second and third periods;

a waveform generator circuit configured to generate a sawtooth wave having the same cycle as the switching cycle;

a first control circuit configured to control the first period for charging the inductor in accordance with a result of adding:

(i) a first amount of error based on a first difference between the first output power supply voltage and a first target value thereof, to (ii) a second amount of error based on a second difference between the second output power supply voltage and a second target value thereof;

wherein the first control circuit includes:

a first current detection circuit configured to detect a current flowing in the inductor and generate a voltage level proportional to the current flowing in the inductor;

an addition circuit configured to provide resistive voltage division between the first amount of error of a first operational amplifier circuit and the second amount of error of a second operational amplifier circuit to generate an added voltage indicative of the sum of the first and second amount of errors at an associated resistive voltage divider node;

a second error detection circuit configured to differentially amplify a predetermined reference voltage and the added voltage by a predetermined gain; and a second comparator circuit configured to compare the output level of the second error detection circuit to the voltage level of the first current detection circuit and control the first period based on a result of the comparison;

a second control circuit configured to control a distribution ratio between the second period and the third period based on a ratio between the first amount of error and the second amount of error;

wherein the second control circuit includes:

a first error detection circuit configured to change an output level thereof based on a ratio between the first amount of error and the second amount of error, and a first comparator circuit configured to compare the sawtooth wave to the output level of the first error detection circuit and control a ratio between the second period and the third period based on a result of the comparison;

the first operational amplifier circuit configured to amplify the first output power supply voltage by a predetermined gain and generate an output voltage level whose central voltage level is adjusted; and the second operational amplifier circuit configured to amplify the second output power supply voltage by a predetermined gain and generates an output voltage level whose central voltage level is adjusted;

wherein one of the first and second operational amplifier circuits is an inverting amplifier circuit and the other of the first and second operational amplifier circuits is a non-inverting operational amplifier circuit, and wherein the first error detection circuit is implemented by a second differential amplifier circuit configured to differentially amplify the output voltage level of the first operational amplifier circuit and the output voltage level of the second operational amplifier circuit by a predetermined gain.

3. The power supply device according to claim 2,
wherein the waveform generator circuit is further configured to set the switching cycle by outputting a trigger signal at predetermined intervals; and
wherein the first period is an interval between a first instant at which the trigger signal is output and a second instant at which the second comparator circuit detects that the output level of the second error detection circuit is reached by the voltage level of the first current detection circuit.

4. The power supply device according to claim 2,
wherein the second comparator circuit is configured to perform a comparison operation based on predetermined hysteresis characteristics; and
wherein the switching cycle is determined based on the hysteresis characteristics.

5. A power supply device, comprising:
a first output node configured to provide a first output voltage;
a first capacitive storage element coupled to the first output node and configured to store the first output voltage;
a second output node configured to provide a second output voltage;
a second capacitive storage element coupled to the second output node and configured to store the second output voltage;
an inductor coupled between the first output node and the second output node;
a plurality of switches configured to charge the inductor in a first mode of operation, discharge the inductor through the first output node in a second mode of operation, and discharge the inductor through the second output node in a third mode of operation,
a first control circuit configured to control the first mode of operation based on a sum of: (i) a first amount of error based on a first difference between the first output voltage and a first target value thereof, and (ii) a second amount of error based on a second difference between the second output voltage and a second target value thereof,
wherein the first control circuit configured to control an amount of electrical power to be charged into the inductor based on a first error output signal reflective of a difference between: (i) the sum of the first and second amount of errors, and (ii) a first predetermined reference voltage; wherein the first control circuit includes:
a first current detection circuit configured to detect a current flowing in the inductor and generate a voltage level proportional to the current flowing in the inductor;
an addition circuit configured to generate a second voltage level by adding the first amount of error to the second amount of error;
a second error detection circuit configured to detect the first error between the first predetermined reference voltage and the second voltage level and change the output level based on the detected amount of the first error; and
a second comparator circuit configured to compare the output level of the second error detection circuit to the voltage level of the first current detection circuit and control the amount of electrical power to be charged into the inductor based on a result of the comparison;
and
a second control circuit configured to control the second and third modes of operations based on a difference between the first amount of error and the second amount of error,
wherein the first, second, and third modes of operation are based on separate periods of a time-division cycle and the separate periods of the time division cycle are sized based on the first amount of error and the second amount of error; wherein:
the first output voltage is reduced below ground potential in the second mode of operation;
the second output voltage is boosted above a supply voltage potential in the third mode of operation:
a period associated with the first mode of operation is increased or decreased based on the first amount of error and the second amount of error; and
a ratio between time periods associated with the second and third modes of operations is increased or decreased based on the first amount of error and the second amount of error.

* * * * *